(12) United States Patent
Jeong et al.

(10) Patent No.: US 9,848,406 B2
(45) Date of Patent: Dec. 19, 2017

(54) METHOD FOR PROVIDING COMMUNICATION SERVICE AND ELECTRONIC DEVICE THEREOF

(71) Applicant: Samsung Electronics Co., Ltd., Gyeonggi-do (KR)

(72) Inventors: Wook-Hyun Jeong, Gyeonggi-do (KR); Sang-Mook Kim, Gyeonggi-do (KR); Jin-Woo You, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/935,014

(22) Filed: Nov. 6, 2015

(65) Prior Publication Data
US 2016/0174271 A1    Jun. 16, 2016

(30) Foreign Application Priority Data
Dec. 16, 2014    (KR) .................. 10-2014-0181619

(51) Int. Cl.
*H04W 40/00* (2009.01)
*H04W 68/12* (2009.01)
*H04W 88/06* (2009.01)
*H04W 36/00* (2009.01)

(52) U.S. Cl.
CPC ........ *H04W 68/12* (2013.01); *H04W 36/0022* (2013.01); *H04W 88/06* (2013.01)

(58) Field of Classification Search
CPC .... H04W 76/021; H04W 92/02; H04W 76/02
USPC ...... 455/445, 435.1, 414.2, 466, 566, 414.1, 455/567
See application file for complete search history.

(56) References Cited

U.S. PATENT DOCUMENTS

| | | | | |
|---|---|---|---|---|
| 6,128,502 A * | 10/2000 | Wizgall | .................. | H04M 3/42 455/415 |
| 7,330,712 B2 * | 2/2008 | Kirkup | ................ | H04L 63/0227 455/410 |
| 7,817,988 B2 * | 10/2010 | Kruis | ...................... | H04W 4/24 455/412.1 |
| 7,860,489 B2 * | 12/2010 | Kuhl | ................... | H04M 1/2745 455/415 |

(Continued)

FOREIGN PATENT DOCUMENTS

| | | |
|---|---|---|
| EP | 2 403 298 | 1/2012 |
| EP | 2 605 562 | 6/2013 |
| WO | WO 2009/105676 | 8/2009 |

OTHER PUBLICATIONS

Hannu Hietalahti, TSG CT Chairman, 3GPP Core Network migration path for HSPA+ and LTE, 3GPP A Global Initiative, May 2010. pp. 1-30.

(Continued)

*Primary Examiner* — Marceau Milord
(74) *Attorney, Agent, or Firm* — The Farrell Law Firm, P.C.

(57) ABSTRACT

An apparatus and a method for providing a Long Term Evolution (LTE) service in an electronic device are provided. A method for operating an electronic device includes connecting to a first network, when being connected to the first network, receiving incoming call information of a second network, obtaining caller identification information of the incoming call information of the second network, and determining whether to connect a call based on the caller identification information.

30 Claims, 19 Drawing Sheets

(56) References Cited

U.S. PATENT DOCUMENTS

| | | | | |
|---|---|---|---|---|
| 7,929,544 B2* | 4/2011 | Kimmitt | ............ | H04M 3/42059 370/395.3 |
| 7,929,955 B1* | 4/2011 | Bonner | ............. | H04M 3/42068 455/414.1 |
| 8,019,081 B2* | 9/2011 | Little | .................... | H04L 9/3247 380/270 |
| 8,081,992 B2* | 12/2011 | Book | .................... | H04M 1/575 370/310.2 |
| 8,190,198 B1* | 5/2012 | Venkataramu | ...... | H04L 63/0853 370/320 |
| 8,369,311 B1* | 2/2013 | Kirchhoff | ......... | H04M 3/42263 370/352 |
| 8,428,232 B2* | 4/2013 | Garcia | .............. | H04M 3/42042 379/142.04 |
| 8,442,190 B2 | 5/2013 | Zi et al. | | |
| 8,644,847 B1* | 2/2014 | Nelissen | ............... | H04W 4/023 455/415 |
| 8,718,624 B2* | 5/2014 | Kim | .................... | G06F 3/04883 345/156 |
| 8,811,575 B2* | 8/2014 | Martino | ................ | H04M 1/578 379/88.13 |
| 8,855,107 B1* | 10/2014 | Kirchhoff | ........... | H04M 1/2535 370/352 |
| 8,908,579 B2* | 12/2014 | Liu | ..................... | H04W 36/005 370/310 |
| 9,213,850 B2* | 12/2015 | Barton | .................. | G06F 21/604 |
| 9,247,059 B1* | 1/2016 | Chidambaram | .... | H04M 3/5166 |
| 9,277,535 B2* | 3/2016 | Cattani | ............... | H04M 7/1215 |
| 2004/0242209 A1* | 12/2004 | Kruis | .................... | H04W 4/001 455/414.1 |
| 2004/0266415 A1 | 12/2004 | Belkin et al. | | |
| 2005/0137983 A1* | 6/2005 | Bells | ........................ | G06F 21/10 705/51 |
| 2006/0013375 A1 | 1/2006 | Smith et al. | | |
| 2008/0014936 A1 | 1/2008 | Fang et al. | | |
| 2013/0089196 A1 | 4/2013 | Coppage | | |
| 2014/0086209 A1 | 3/2014 | Su et al. | | |

OTHER PUBLICATIONS

International Search Report dated Mar. 30, 2016 issued in counterpart applicaton No. PCT/KR2015/013643, 14 pages.
European Search Report dated May 12, 2016 issued in counterpart application No. 15194561.5-1505, 6 pages.
European Search Report dated Apr. 19, 2017 issued in counterpart application No. 15194561.5-1505, 4 pages.

\* cited by examiner

METHOD FOR PROVIDING COMMUNICATION SERVICE AND ELECTRONIC DEVICE THEREOF

PRIORITY

The present application claims priority under 35 U.S.C. §119(a) to a Korean patent application filed in the Korean Intellectual Property Office on Dec. 16, 2014, and assigned Serial No. 10-2014-0181619, the entire disclosure of which is incorporated herein by reference.

BACKGROUND

1. Field of Invention

The present disclosure relates generally to an apparatus and a method for providing a Long Term Evolution (LTE) service in an electronic device.

2. Description of Related Art

An electronic device for providing an LTE service can support a multi-mode in a single radio environment. When supporting the multi-mode in the single radio environment, the electronic device can transmit and receive signals by accessing a network (e.g., an LTE network, a 2nd Generation (2G)/3rd generation (3G) network) conforming to one of a plurality of communication technologies supported. For example, when supporting the multi-mode in the single radio environment, the electronic device can access the LTE network (e.g., a Packet Switching (PS) service network) and provide the LTE service. When receiving a call of a Circuit Switching (CS) service network (e.g., a 2G/3G network) during the LTE service, the electronic device can access the CS service network and provide a voice service.

SUMMARY

When accessing the 3G network (e.g., the CS service network) for the voice service, the electronic device supporting the multi-mode in the single radio environment can hand the LTE service (data service) to the 3G network. In this case, the electronic device is subject to a data service delay or a data service interruption due to the declined data transfer rate.

The present disclosure has been made to address at least the problems and disadvantages described above, and to provide at least the advantages described below.

Accordingly, an aspect of the present disclosure is to provide an apparatus and a method for continuously providing a Long Term Evolution (LTE)-based data service in an electronic device.

In accordance with an aspect of the present disclosure, a method for operating an electronic device is provided. The method includes connecting to a first network, receiving incoming call information of a second network, while connected to the first network obtaining caller identification information of the incoming call information of the second network, and determining whether to connect a call based on the caller identification information.

In accordance with another aspect of the present disclosure, a method for operating an electronic device is provided. The method includes connecting to a first network, receiving incoming call information of a second network while connected to the first network, obtaining caller identification information of the incoming call information by connecting to the second network, and determining whether to connect a call based on the caller identification information.

In accordance with yet another aspect of the present disclosure, an electronic device is provided. The electronic device includes a communication interface and a processor. The communication interface is configured to transmit and receive signals over a plurality of networks. The processor is configured to connect to a first network through the communication interface, receive incoming call information of a second network while connected to the first network, obtain caller identification information of the incoming call information of the second network, and determine whether to connect a call based on the caller identification information.

In accordance with still another aspect of the present disclosure, an electronic device includes a communication interface and a processor. The communication interface is configured to transmit and receive signals over a plurality of networks. The processor is configured to connect to a first network through the communication interface, receive incoming call information of a second network while connected to the first network, obtain caller identification information of the incoming call information by connecting to the second network, and determine whether to connect a call based on the caller identification information.

BRIEF DESCRIPTION OF THE DRAWINGS

The above and other aspects, features, and advantages of certain embodiments of the present disclosure will be more apparent from the following description when taken in conjunction with the accompanying drawings, in which.

DETAILED DESCRIPTION OF EMBODIMENTS THE PRESENT DISCLOSURE

Figure 1:
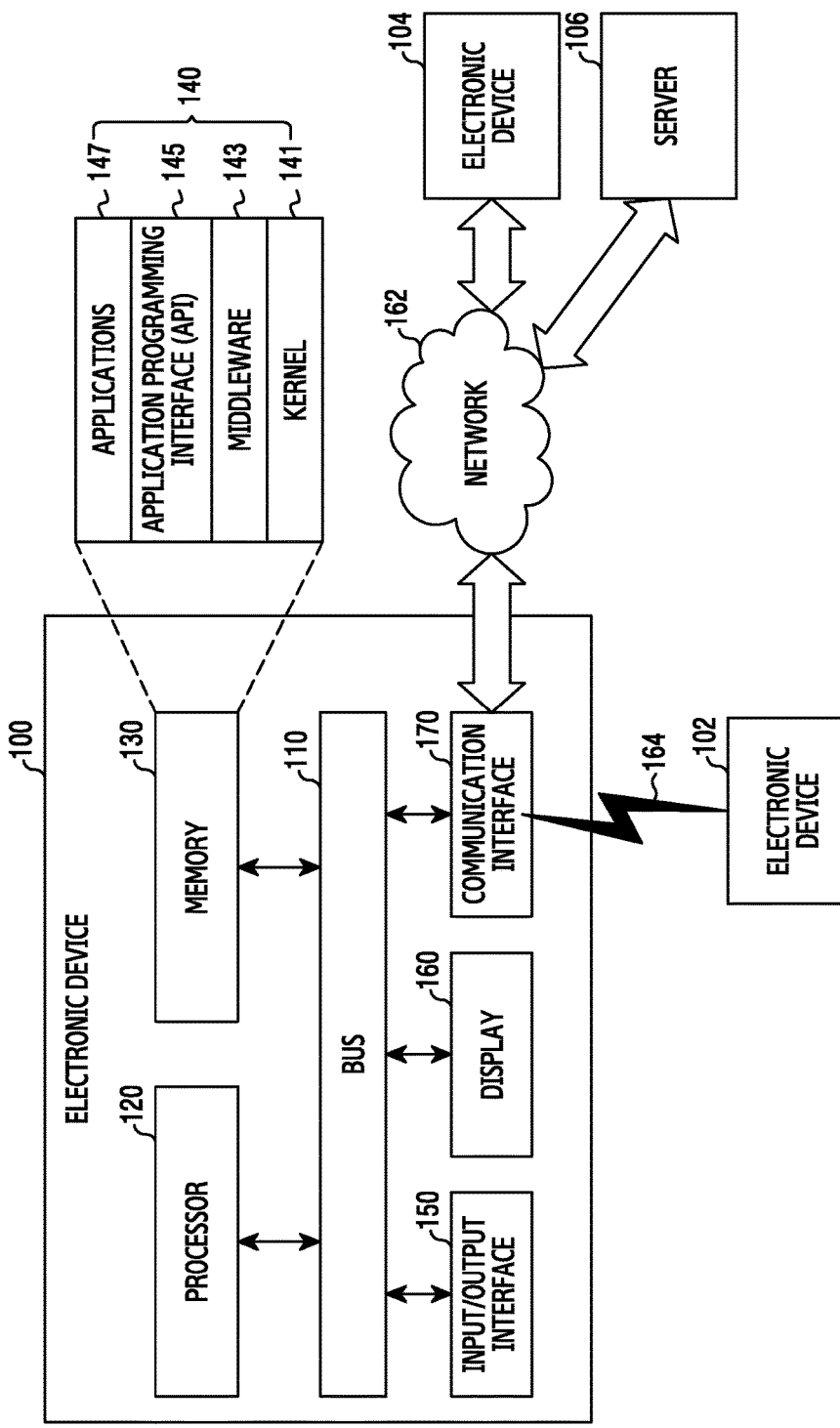
FIG. 1 is a block diagram of a configuration an electronic device, according to an embodiment of the present disclosure.

The following description with reference to the accompanying drawings, wherein like reference numerals refer to like parts, components, and structures throughout, is provided to assist in a comprehensive understanding of various embodiments of the present disclosure as defined by the claims and their equivalents. It includes various specific details to assist in that understanding, but these embodiments are to be regarded as merely illustrative. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Herein, singular forms "a," "an," and "the" include plural referents unless the context clearly dictates otherwise. Thus, for example, reference to "a component surface" includes reference to one or more of such surfaces.

The terms "have", "may have", "include", or "may include" as used herein indicate the presence of disclosed corresponding functions, operations, elements, etc., and do not limit additional one or more functions, operations, elements, etc. In addition, the terms "include" or "have" indicate the presence of features, numbers, operations, elements, parts, or a combination thereof described in the specifications, and do not preclude the presence or addition of one or more other features, numbers, operations, elements, parts, or a combination thereof.

The terms "A or B", "at least one of A or/and B" or "one or more of A or/and B" as used herein include any and all combinations of words enumerated with it. For example, "A or B", "at least one of A and B" or "at least one of A or B" describes (1) including A, (2) including B, or (3) including both A and B.

Although terms such as "first" and "second" as used herein may modify various elements of various embodiments of the present disclosure, these terms do not limit the corresponding elements. For example, these terms do not limit an order and/or importance of the corresponding elements. These terms may be used for the purpose of distinguishing one element from another element. For example, a first user device and a second user device both indicate user devices and may indicate different user devices. For example, a first element may be named a second element without departing from the scope of the present disclosure, and similarly, a second element may be named a first element.

When an element (e.g., a first element) is "connected to" or "(operatively or communicatively) coupled with/to" another element (e.g., a second element), the first element may be directly connected or coupled to the second element, and there may be an intervening element (e.g., a third element) between the first element and the second element. To the contrary, when an element (e.g., the first element) is "directly connected" or "directly coupled" to another element (e.g., the second element), there is no intervening element (e.g., the third element) between the first element and the second element.

The expression "configured to (or set to)" as used herein may be replaced with "suitable for", "having the capacity to", "designed to", "adapted to", "made to", or "capable of" according to the situation. The term "configured to (set to)" does not necessarily indicate "specifically designed to" in a hardware level. Instead, the expression "apparatus configured to . . . " may indicate that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. Further, all the terms used herein, including technical and scientific terms, should be interpreted to have the same meanings as commonly understood by those skilled in the art to which the present disclosure pertains, and should not be interpreted to have ideal or excessively formal meanings, unless explicitly defined herein.

A module or programming module, according to various embodiments of the present disclosure, may further include at least one or more constituent elements among the aforementioned constituent elements, or may omit some of them, or may further include additional constituent elements. Operations performed by a module, programming module, or other constituent elements may be executed in a sequential, parallel, repetitive, or heuristic manner. In addition, some of the operations may be executed in a different order or may be omitted, or other operations may be added.

An electronic device, according to various embodiments of the present disclosure, may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an motion picture experts group (MPEG-1 or MPEG-2) audio layer 3 (MP3) player, a mobile medical device, a camera, or a wearable device (e.g., a head-mounted-device (HMD), an electronic glasses, an electronic clothing, an electronic bracelet, an electronic necklace, an electronic appcessory, an electronic tattoo, a smart mirror, a smart watch, etc.).

An electronic device may also be a smart home appliance. For example, smart home appliances may include at least one of a television (TV), a digital versatile disk (DVD) player, an audio component, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV), a game console (e.g., Xbox® PlayStation®), an electronic dictionary, an electronic key, a camcorder, an electronic frame, etc.

An electronic device may also include at least one of a medical equipment (e.g., a mobile medical device (e.g., a blood glucose monitoring device, a heart rate monitor, a blood pressure monitoring device, a temperature meter, etc.), a magnetic resonance angiography (MRA) machine, a magnetic resonance imaging (MRI) machine, a computed tomography (CT) scanner, an ultrasound machine, etc.), a navigation device, a global positioning system (GPS) receiver, an event data recorder (EDR), a flight data recorder (FDR), an in-vehicle infotainment device, an electronic equipment for a ship (e.g., a ship navigation equipment and/or a gyrocompass), an avionics equipment, a security equipment, a head unit for vehicle, an industrial or home robot, an automatic teller machine (ATM), point of sale (POS) device, or an internet of things device (e.g., a light bulb, various sensors, an electronic meter, a gas meter, a sprinkler, a fire alarm, a thermostat, a streetlamp, a toaster, a sporting equipment, a hot-water tank, a heater, a boiler, etc.)

An electronic device may also include at least one of a piece of furniture or a building/structure, an electronic board, an electronic signature receiving device, a projector, and various measuring instruments (e.g., a water meter, an electricity meter, a gas meter, a wave meter, etc.).

An electronic device may also include a combination of one or more of the above-mentioned devices.

Further, it will be apparent to those skilled in the art that an electronic device is not limited to the above-mentioned examples.

Herein, the term "user" may indicate a person who uses an electronic device or a device (e.g., an artificial intelligence electronic device) that uses the electronic device.

An electronic device of a single radio environment can provide LTE service using Circuit Switched Fall Back (CSFB) which determines whether paging information of a CS service network is received over an LTE network. When receiving a paging signal of the CS service network over the LTE network, the electronic device connects (or accesses) the CS service network (e.g., a 2G/3G network) and provides a voice call service. For example, the 2G network can include one or more of a Global System for Mobile communication (GSM) network and a Code Division Multiple Access (CDMA) network. The 3G network can include one or more of a Wideband-CDMA (WCDMA) network, a Time Division-Synchronous CDMA (TD-SCDMA) network, and an Evolution-Data Optimized (EV-DO) network.

Alternatively, the electronic device of the single radio environment can provide LTE service using Single Radio LTE (SRLTE) which determines whether the paging information is received by periodically switching every radio resource (e.g., receive antennas) to the CS service network (e.g., the 2G/3G network). Upon receiving the paging signal of the CS service network, the electronic device provides the voice call service by connecting the CS service network (e.g., the 2G/3G network).

Alternatively, the electronic device of the single radio environment can provide LTE service using Single Radio Dual System (SRDS) which determines whether the paging information is received by periodically switching some of radio resources (e.g., receive antennas) to the CS service network (e.g., the 2G/3G network). Upon receiving the paging signal of the CS service network, the electronic device provides the voice call service by connecting the CS service network (e.g., the 2G/3G network).

FIG. 1 is a block diagram of a configuration an electronic device, according to an embodiment of the present disclosure.

Referring to FIG. 1, the electronic device 100 includes a bus 110, a processor 120, a memory 130, an input/output interface 150, a display 160, and a communication interface 170. In various embodiments of the present disclosure, the electronic device 100 can omit at least one of the components or further include another component.

The bus 110 includes a circuit for connecting the components (e.g., the processor 120, the memory 130, the input/output interface 150, the display 160, and the communication interface 170) and delivering communications (e.g., a control message) therebetween.

The processor 120 includes one or more of a Central processing Unit (CPU), an Application Processor (AP), and a Communication Processor (CP). The processor 120 processes an operation or data on control of and/or communication with another component of the electronic device 100.

The processor 120, which is connected to the LTE network, determines whether a call is connected over the CS service network using caller identification information (e.g., a caller phone number) of the CS service network (e.g., the 2G/3G network). For example, the processor 120 receives incoming call information (e.g., a CS notification message or a paging request message) of the CS service network over the LTE network (e.g., CSFB). For example, the processor 120 being connected to the LTE network receives incoming call information (e.g., a paging request message) over the CS service network (e.g., SRLTE).

When receiving the incoming call information (e.g., a CS notification message or a paging request message) of the CS service network over the LTE network, the processor 120 obtains caller identification information from the incoming call information. The processor 120 displays the caller identification information on its display 160. The processor 120 determines whether to connect the call based on input information corresponding to the caller identification information displayed on the display 160. For example, when detecting input information corresponding to an incoming call rejection, through the input/output interface 150, the processor 120 restricts the voice call connection and maintains the LTE network connection. For example, when detecting input information corresponding to an incoming call acceptance, through the input/output interface 150, the processor 120 connects the voice call by connecting to the CS service network.

When receiving the incoming call information (e.g., a CS notification message or a paging request message) of the CS service network over the LTE network, the processor 120 obtains caller identification information from the incoming call information. The processor 120 determines whether to connect the call by comparing the caller identification information with a reception control list. For example, when the caller identification information is included in a first reception control list (e.g., a blacklist), the processor 120 restricts the voice call connection and maintains the connection to the LTE network. For example, when the caller identification information is not included in the first reception control list (e.g., the blacklist), the processor 120 connects the voice call by connecting to the CS service network. For example, when the caller identification information is included in a second reception control list (e.g., a white list), the processor 120 connects the voice call by connecting to the CS service network.

When receiving the incoming call information (e.g., a paging request message) of the CS service network over the LTE network, the processor 120 sends an incoming call response message (e.g., a paging response message) to the CS service network. The processor 120 suspends the LTE service and receives the caller identification information (e.g., a Circuit-switched Call (CC) setup message) from the CS service network. The processor 120 determines whether to connect the call by comparing the caller identification information with the reception control list. For example, when the caller identification information is included in the first reception control list (e.g., the blacklist), the processor 120 restricts the voice call connection and resumes the LTE network connection. For example, when the caller identification information is not included in the first reception control list (e.g., the blacklist), the processor 120 connects the voice call by connecting to the CS service network. For example, when the caller identification information is included in the second reception control list (e.g., the white list), the processor 120 connects the voice call by connecting to the CS service network.

The memory 130 can include volatile and/or nonvolatile memory. The memory 130 stores commands or data (e.g., the reception control list) relating to at least another component of the electronic device 100. The memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 controls or manages system resources (e.g., the bus 110, the processor 120, or the memory 130) used for performing an operation or function implemented by the other programs (e.g., the middleware 143, the API 145, or the applications 147). Furthermore, the kernel 141 provides an interface through which the middleware 143, the API 145, or the applications 147 connects the individual elements of the electronic device 100 to control or manage the system resources.

The middleware 143 functions as an intermediary for allowing the API 145 or the applications 147 to communicate with the kernel 141 to exchange data.

In addition, the middleware 143 processes one or more task requests received from the applications 147 according to priorities thereof. For example, the middleware 143 assigns priorities for using the system resources (e.g., the bus 110, the processor 120, the memory 130, etc.) of the electronic device 100, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function (e.g., an instruction) for file control, window control, image processing, text control, etc.

The input/output interface 150 functions as an interface that transfers instructions or data input from a user or another external device to the other element(s) of the electronic device 100. Furthermore, the input/output interface 150 outputs the instructions or data received from the other element(s) of the electronic device 100 to the user or an external electronic device.

The display 160 may include a liquid crystal display (LCD), a light emitting diode (LED) display, an organic LED (OLED) display, a micro electro mechanical system (MEMS) display, an electronic paper display, etc. The display 160 displays various types of content (e.g., a text, images, videos, icons, symbols, etc.) for the user. The display 160 may include a touch screen and receive, for example, a touch, a gesture, proximity, a hovering input, etc., using an electronic pen or the user's body part. The display 160 may display a web page.

The communication interface 170 can establish a communication between the electronic device 100 and an external electronic device (e.g., a first external electronic device 102, a second external electronic device 104, or a server 106). For example, the communication interface 170 can communicate with the first external electronic device 102, the second external electronic device 104, or the server 106 in connection to the network 162 through wireless communication or wired communication. For example, the wireless communication can conform to a cellular communication protocol including at least one of LTE, LTE-Advanced (LTE-A), CDMA, WCDMA, Universal Mobile Telecommunication System (UMTS), WiBro, and GSM.

The wired communication can include at least one of Universal Serial Bus (USB), High Definition Multimedia Interface (HDMI), Recommended Standard 232 (RS-232), and Plain Old Telephone Service (POTS).

The network 162 can include at least one of telecommunications networks, for example, a computer network (e.g., Local Area Network (LAN) or Wide Area Network (WAN)), Internet, and a telephone network.

The electronic device 100 provides the LTE service in the single radio environment by use of at least one module functionally or physically separated from the processor 120.

Figure 2:
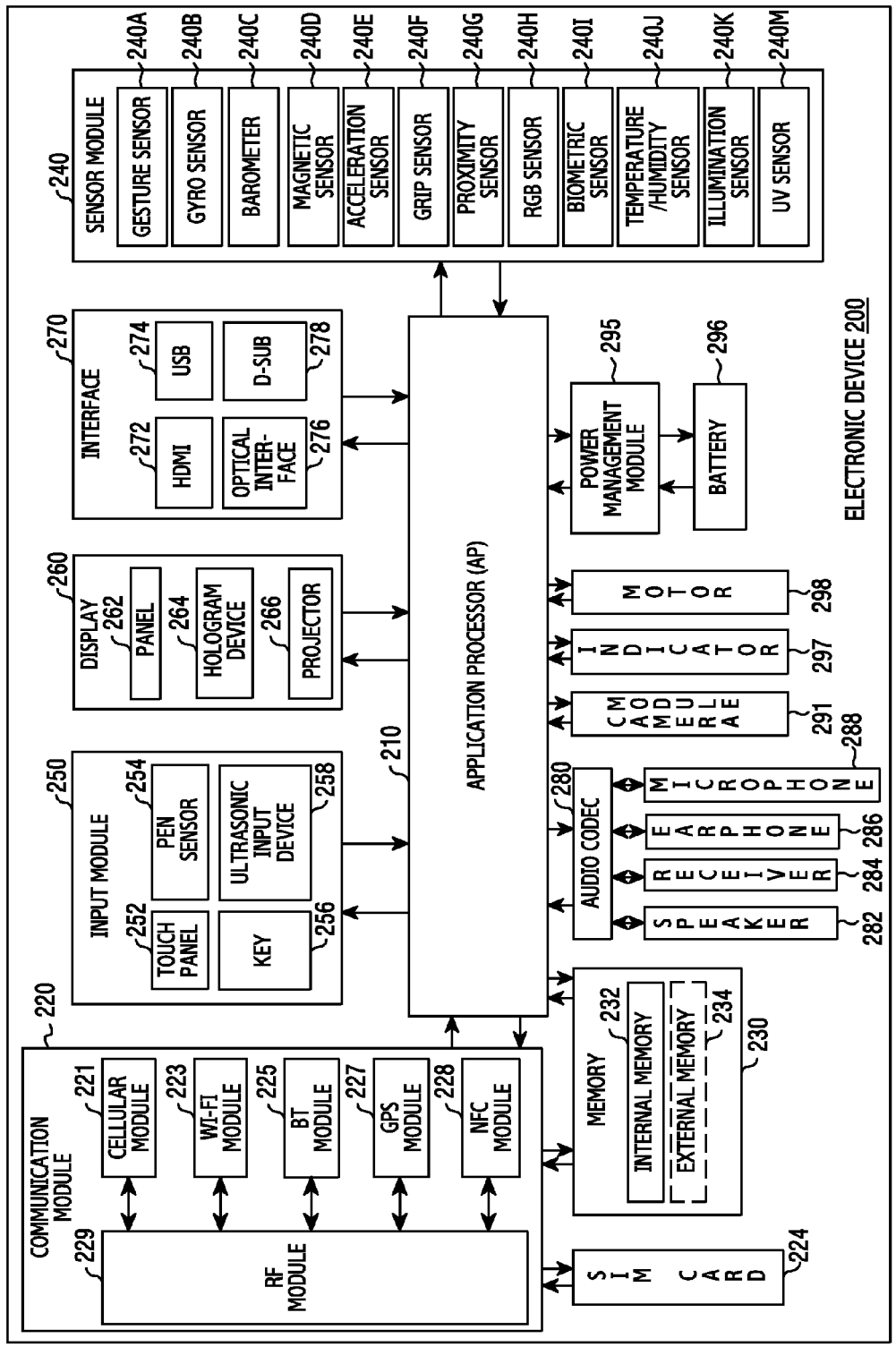
FIG. 2 is a block diagram of a detailed configuration of an electronic device, according to an embodiment of the present disclosure.

FIG. 2 is a block diagram of a detailed configuration of an electronic device, according to an embodiment of the present disclosure Referring to FIG. 2, the electronic device 200 is provided. The electronic device 200 may form a part or the entirety of the electronic device 100 illustrated in FIG. 1. The electronic device 200 includes one or more Application Processors (APs) 210, a communication module 220, a Subscriber Identification Module (SIM) card 224, a memory 230, a sensor module 240, an input module 250, a display 260, an interface 270, an audio codec module 280, a camera module 291, a power management module 295, a battery 296, an indicator 297, and a motor 298.

The AP 210 drives an OS or an application program so as to control a plurality of hardware or software components connected to the AP 210, and executes data processing and operations associated with various data including multimedia data. The AP 210 may be implemented by, for example, a System on Chip (SoC). According to an embodiment, the AP 210 may further include a graphic processing unit (GPU).

The communication module 220 (for example, the communication interface 170) performs data transmission/reception between the electronic device 200 (for example, the electronic device 100) and other electronic devices connected thereto through the network. The communication module 220 includes a cellular module 221, a Wi-Fi module 223, a BlueTooth (BT) module 225, a GPS module 227, a near-field communication (NFC) module 228, and a radio frequency (RF) module 229.

The cellular module 221 provides a voice call, a video call, a short message service (SMS), or an Internet service through a communication network (for example, LTE, LTE-A, CDMA, WCDMA, UMTS, WiBro, or GSM). Further, the cellular module 221 distinguishes between and authenticates electronic devices in a communication network using, for example, a subscriber identification module (for example, the SIM card 224). The cellular module 221 may perform at least some of the functions that the AP 210 provides. For example, the cellular module 221 performs at least some of the multimedia control functions.

The cellular module 221 can include a CP. The cellular module 221 can be implemented using an SoC. While the components of the cellular module 221 (e.g., the CP), the memory 230, and the power management module 295 are separated from the AP 221 in FIG. 2, the AP 210 can include at least part (e.g., the cellular module 221) of the above-stated components.

The AP 210 or the cellular module 221 (e.g., the CP), being connected to the LTE network, determines whether to connect the call over the CS service network using the caller identification information (e.g., the caller phone number) of the CS service network (e.g., the 2G/3G network).

The AP 210 or the cellular module 221 (e.g., the CP) loads and processes the instruction or the data received from its connected non-volatile memory or at least one of the other components, in a volatile memory. Also, the AP 210 or the cellular module 221 stores data received from at least one of the other components or generated by at least one of the other components, in the non-volatile memory.

Each of the Wi-Fi module 223, the BT module 225, the GPS module 227, and the NFC module 228 may include a processor for processing data transmitted/received through the corresponding module. Although each of the cellular module 221, the Wi-Fi module 223, the BT module 225, the GPS module 227, and the NFC module 228 is shown as a separate block in FIG. 2, at least some of the cellular module 221, the Wi-Fi module 223, the BT module 225, the GPS module 227, and the NFC module 228 may be included in one integrated chip (IC) or IC package. For example, at least some (for example, the communication processor corresponding to the cellular module 221 and the Wi-Fi processor corresponding to the Wi-Fi module 223) of processors corresponding to the cellular module 221, the Wi-Fi module 223, the BT module 225, the GPS module 227, and the NFC module 228 may be implemented as one SoC.

The RF module 229 transmits and receives data, for example, RF signals. The RF module 229 may include, for example, a transceiver, a Power Amp Module (PAM), a frequency filter, a Low Noise Amplifier (LNA), etc. The RF module 229 may further include a component for transmitting and receiving an electromagnetic wave in the free airspace in wireless communication, for example, a conductor or a conductive wire. Although the cellular module 221, the Wi-Fi module 223, the BT module 225, the GPS module 227, and the NFC module 228 are illustrated to share one RF module 229 in FIG. 2, at least one of the cellular module 221, the Wi-Fi module 223, the BT module 225, the GPS module 227, and the NFC module 228 may transmit/receive the RF signal through a separate RF module according to an embodiment.

The RF module 229 can include at least one of a main antenna and a subsidiary antenna functionally connected to the electronic device 200. The communication module 220 can support Multiple Input Multiple Output (MIMO), such as diversity, using the main antenna and the subsidiary antenna.

The SIM card 224 is a card which is inserted into a slot formed in a predetermined position of the electronic device 200. The SIM card 224 includes unique identification information (e.g. an integrated circuit card identifier (ICCID)) or unique subscriber information (e.g., an international mobile subscriber identity (IMSI)).

The memory 230 includes an internal memory 232 or an external memory 234. The internal memory 232 includes at least one of a volatile memory (for example, a Dynamic Random Access Memory (DRAM), a Static RAM (SRAM), a Synchronous Dynamic RAM (SDRAM), etc.) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, etc.).

The internal memory 232 may be a Solid State Drive (SSD).

The external memory 234 may include a flash drive, for example, a compact flash (CF), a secure digital (SD), a micro secure digital (Micro-SD), a mini secure digital (Mini-SD), an extreme digital (xD), a Memory Stick, etc. The external memory 234 is functionally connected to the electronic device 200 through various interfaces.

The electronic device 200 may further include a storage electronic device (or storage medium) such as a hard disc drive.

The sensor module 240 measures a physical quantity or senses an operational state of the electronic device 200 and converts the measured or sensed information to an electric signal. The sensor module 240 includes at least one of a gesture sensor 240A, a gyro sensor 240B, an atmospheric pressure sensor (barometer) 240C, a magnetic sensor 240D, an acceleration sensor 240E, a grip sensor 240F, a proximity sensor 2406, a color sensor (Red/Green/Blue (RGB)) 240H, a biometric sensor 240I, a temperature/humidity sensor 240J, an illumination sensor 240K, and an Ultra Violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an Infrared (IR) sensor, an iris sensor, a fingerprint sensor, etc. The sensor module 240 may further include a control circuit for controlling one or more sensors included therein.

The input module 250 includes a touch panel 252, a (digital) pen sensor 254, a key 256, or an ultrasonic input electronic device 258. The touch panel 252 recognizes a touch input in at least one of, for example, a capacitive type, a resistive type, an infrared type, and an acoustic wave type. Also, the touch panel 252 may further include a control circuit. A capacitive touch panel recognizes a physical contact or proximity. The touch panel 252 may further include a tactile layer. In this case, the touch panel 252 provides a user with a tactile reaction.

The (digital) pen sensor 254 may be implemented using a method identical or similar to a method of receiving a user's touch input, or using a separate recognition sheet.

The key 256 may include, for example, a physical button, an optical key, or a keypad.

The ultrasonic input electronic device 258 is a device which may detect a micro acoustic wave by a microphone 288 of the electronic device 200 through an input means generating an ultrasonic signal to identify data and performs wireless recognition.

The electronic device 200 may also receive a user input from an external electronic device (for example, a computer or a server) connected thereto by using the communication module 220.

The display 260 (for example, the display 160) includes a panel 262, a hologram device 264, or a projector 266.

The panel 262 may be, for example, an LCD, an Active Matrix-OLED (AM-OLED), etc. The panel 262 may be implemented to be flexible, transparent, or wearable. The panel 262 and the touch panel 252 may be implemented as one module.

The hologram device 264 displays a stereoscopic image in the air by using interference of light.

The projector 266 displays an image by projecting light onto a screen. The screen may be located inside or outside the electronic apparatus 200.

The display 260 may further include a control circuit for controlling the panel 262, the hologram device 264, or the projector 266.

The interface 270 may include a high definition multimedia interface (HDMI) 272, a universal serial bus (USB) 274, an optical interface 276, and a D-subminiature (D-sub) 278. Additionally or alternatively, the interface 270 may include a mobile high-definition link (MEL) interface, a secure digital (SD) card/multi-media card (MMC) interface, or an infrared data association (IrDA) interface.

The audio module 280 bi-directionally converts a sound and an electrical signal. The audio module 280 processes sound information which is input or output through, for example, a speaker 282, a receiver 284, earphones 286, and the microphone 288.

The camera module 291 is an electronic device for photographing still and moving images, and includes one or more image sensors (e.g., a front sensor or a rear sensor), a lens, an image signal processor (ISP), or a flash (for example, an LED or a xenon lamp).

The power management module 295 manages power of the electronic device 200. Although not illustrated, the power management module 295 includes, for example, a Power Management Integrated Circuit (PMIC), a charger Integrated Circuit (IC), or a battery gauge.

The PMIC may be mounted within an integrated circuit or an SoC semiconductor.

Charging methods may be classified into a wired charging method and a wireless charging method. The charger IC charges a battery and prevents an overvoltage or excess current from being induced or from flowing from a charger. The charger IC may include a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging.

The battery gauge measures a residual quantity, a voltage, a current, or a temperature of the battery 296 during charging. The battery 296 may store or generate electricity and may supply power to the electronic device 200 by using the stored or generated electricity. The battery 296 may include a rechargeable battery or a solar battery.

The indicator 297 displays a predetermined state of the electronic device 200 or a part of the electronic device 200 (for example, the AP 210), such as a booting state, a message state, a charging state, etc.

The motor 298 converts an electrical signal into a mechanical vibration.

The electronic apparatus 200 may include a processing electronic device (for example, a GPU) for supporting a mobile television (TV). The processing electronic device for supporting the mobile TV processes media data pursuant to a certain standard of digital multimedia broadcasting (DMB), digital video broadcasting (DVB), or media flow.

Each of the above-mentioned components of the electronic device 200 can be configured with at least one component, and the name of a corresponding component can vary according to a kind of electronic device.

The electronic device 200 can be configured including at least one of the above-mentioned components or another component, or not including some of the above-mentioned components.

Additionally, some of components in the electronic device 200 can be configured as one entity, so that functions of the individual corresponding components are performed identically.

The electronic device (i.e., electronic device 100 or 200) includes a communication interface for transmitting and receiving signals over a plurality of networks, and a processor for connecting a first network through the communication interface, when being connected to the first network, receiving incoming call information of a second network, obtaining caller identification information of the incoming call information of the second network, and determining whether to connect a call based on the caller identification information.

The first network includes an LTE network.

The second network includes a CS service network comprising at least one of a 2G network and a 3G network, the 2G network can include one or more of a GSM network and a CDMA network, and the 3G network can include one or more of a WCDMA network, a TD-SCDMA network, and an EV-DO network.

The processor receives the incoming call information of the second network over the first network using the communication interface.

The processor, being connected to the first network using the communication interface, switches at least part of radio resources to the second network, and receives the incoming call information of the second network over the second network.

The processor obtains the caller identification information of the incoming call information, in the incoming call information of the second network.

The electronic device further includes a display for displaying information, and the processor displays the caller identification information on the display and determines whether to connect the call based on the input information corresponding to the caller identification information displayed on the display.

The processor compares the caller identification information with a reception control list and determines whether to connect the call based on the comparison of the caller identification information and the reception control list.

When determining to reject the call connection, the processor controls to maintain the first network connection.

When determining to accept the call connection, the processor controls to hand over the call to the second network and to connect the call over the second network.

Alternatively, electronic device (i.e., electronic device 100 or 200) includes a communication interface for transmitting and receiving signals over a plurality of networks, and a processor for connecting a first network through the communication interface, when being connected to the first network, receiving incoming call information of a second network, obtaining caller identification information of the incoming call information by connecting the second network, and determining whether to connect a call based on the caller identification information.

Figure 3:
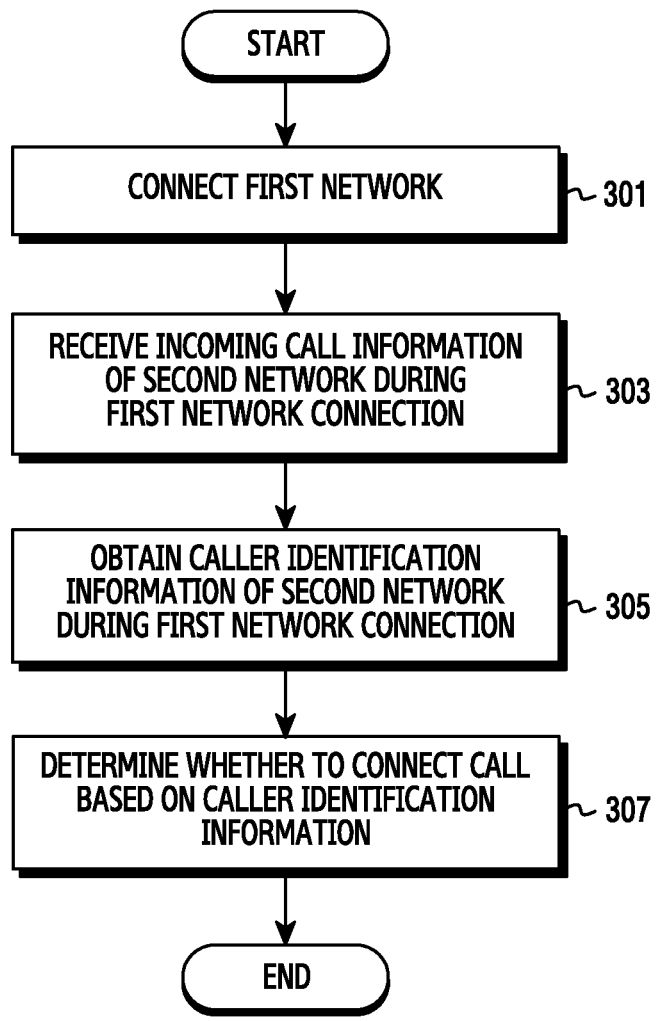
FIG. 3 is a flowchart of a method for determining whether to connect a call in an electronic device, according to an embodiment of the present disclosure.

FIG. 3 is a flowchart illustrating a method for determining whether to connect a call in an electronic device, according to an embodiment of the present disclosure.

Referring to FIG. 3, in operation 301, the electronic device 100 connects to a first network (e.g., an LTE network). For example, the electronic device 100 provides LTE service by connecting to the LTE network. The electronic device 100 can operate in an idle mode during the LTE network connection.

In operation 303, the electronic device 100 receives incoming call information of a second network (e.g., the CS service network) during the first network (e.g., the LTE network) connection. For example, the electronic device 100 provides the LTE service using the CSFB. In this case, the electronic device 100 receives the incoming call information of the CS service network (e.g., the 2G/3G network) over the LTE network. For example, the electronic device 100 provides the LTE service using the SRLTE or the SRDS. In this case, the electronic device 100, being connected to the LTE network, receives the incoming call information of the CS service network by switching all or at least part of the radio resources (e.g., receive antennas) to the CS service network (e.g., the 2G/3G network). The second network can include a legacy network for providing a voice service over the CS service network such as a 2G/3G network.

In operation 305, the electronic device 100, being connected to the first network, obtains the caller identification information (e.g., the caller phone number) of the incoming call information of the second network. For example, the electronic device 100 obtains the caller identification information from the incoming call information (e.g., a CS notification message or a paging request message) of the CS service network, received over the LTE network. For example, the electronic device 100 obtains the caller identification information from the incoming call information (e.g., a paging request message) received over the CS service network.

Figure 5:
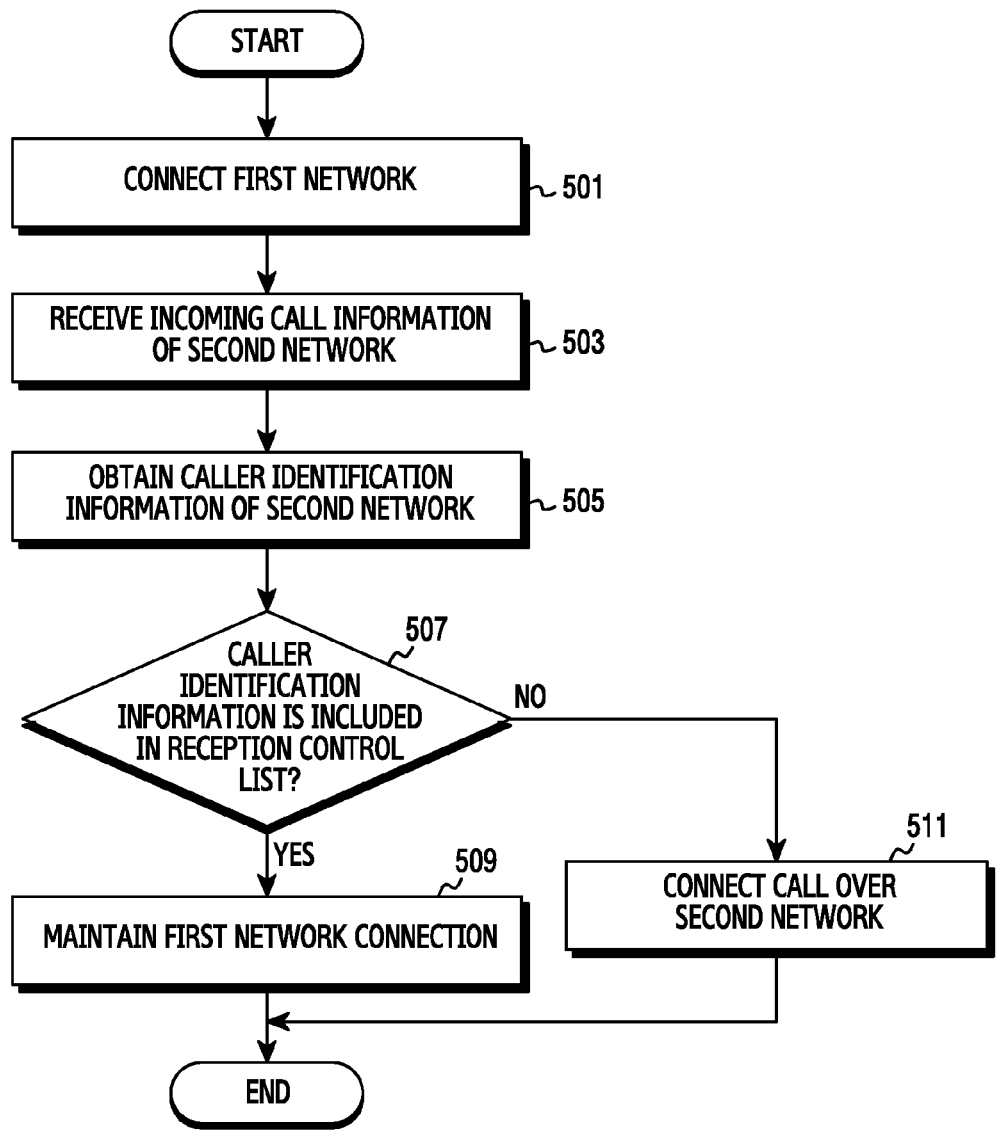
FIG. 5 is a flowchart illustrating a method for determining whether to connect a call based on connection priority of caller identification information in an electronic device, according to an embodiment of the present disclosure.

In operation 307, the electronic device 100, being connected to the first network, determines whether to connect (to receive) the call based on the caller identification information of the CS service network. For example, the electronic device 100 determines whether to connect (to receive) the call based on input information corresponding to the caller identification information displayed on a display 160. For example, the electronic device 100 determines whether to connect (to receive) the call by comparing the reception control list with the caller identification information as shown in FIG. 5.

Figure 4:
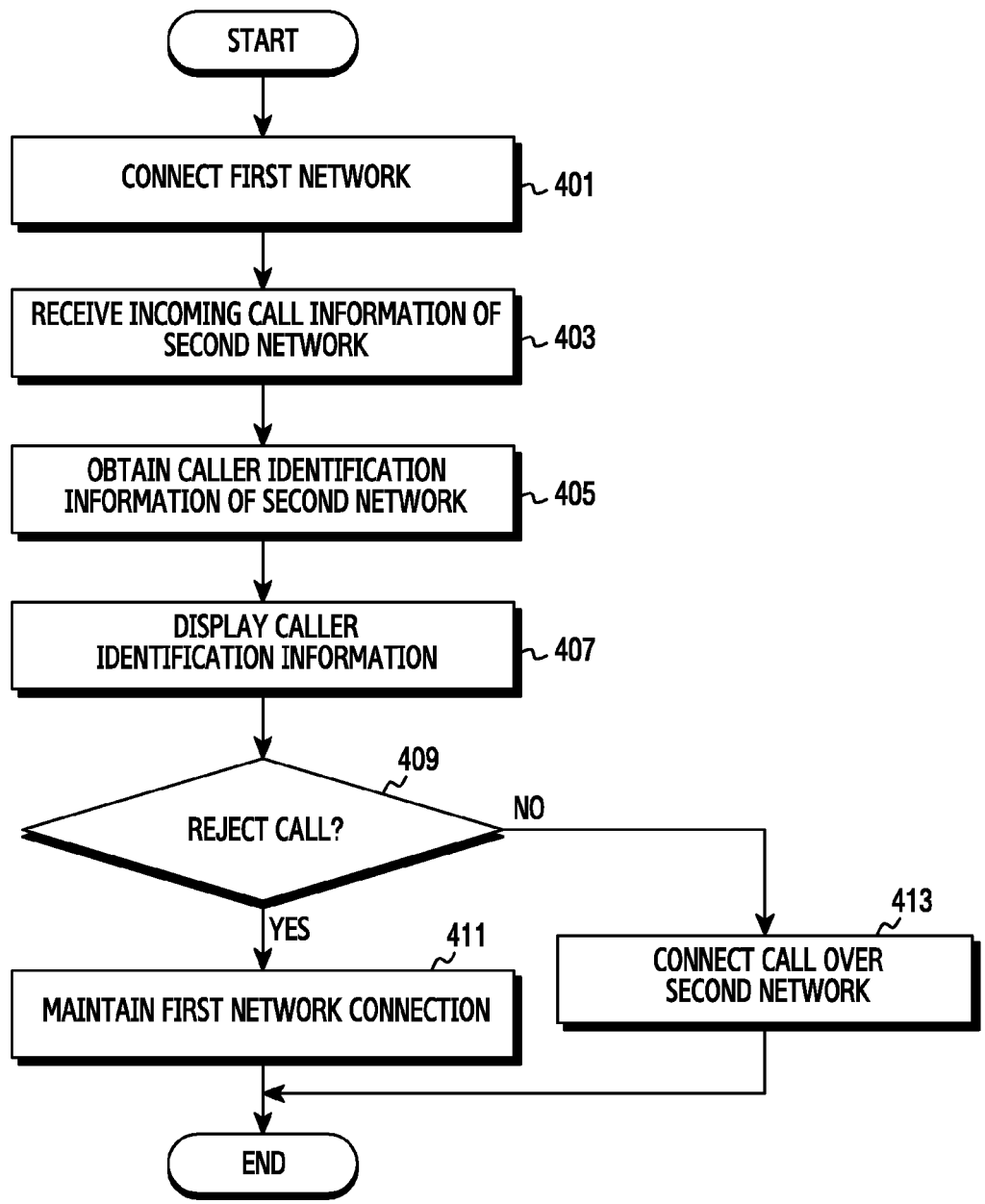
FIG. 4 is a flowchart illustrating a method for determining whether to connect a call based on input information in an electronic device, according to an embodiment of the present disclosure.

FIG. 4 is a flowchart illustrating a method for determining whether to connect a call based on input information in an electronic device, according to an embodiment of the present disclosure.

Referring to FIG. 4, in operation 401, the electronic device 100 connects to a first network (e.g., an LTE network).

In operation 403, the electronic device 100 receives incoming call information of a second network (e.g., a CS service network) during the first network (e.g., the LTE network) connection. For example, the electronic device 100, being connected to the LTE network, receives the incoming call information from the CS service network over the LTE network or the CS service network.

In operation 405, the electronic device 100, being connected to the first network, obtains the caller identification information (e.g., the caller phone number) of the incoming call information of the second network. For example, the electronic device 100 obtains the caller identification information from the incoming call information (e.g., a CS notification message or a paging request message) of the CS service network.

In operation 407, the electronic device 100, being connected to the first network, displays the caller identification information (the caller identification information obtained in operation 405) of the second network on a display 160.

In operation 409, the electronic device 100 determines whether input information corresponding to an incoming call rejection is detected in relation to the caller identification information displayed on the display 160. For example, the electronic device 100 determines whether input information corresponding to the incoming call rejection is detected through an input/output interface 150.

When detecting the input information corresponding to the incoming call rejection, the electronic device 100 can maintains the first network connection in operation 411. For example, when detecting the input information corresponding to the incoming call rejection, the electronic device 100 maintains the LTE service without having to connect the call of the CS service network.

When detecting the input information corresponding to an incoming call acceptance, the electronic device 100 connects the voice call by connecting to the second network in operation 413. For example, to connect the call of the CS service network, the electronic device 100 releases the LTE network connection and connects to the CS service network.

FIG. 5 is a flowchart illustrating a method for determining whether to connect a call based on connection priority of caller identification information in an electronic device, according to an embodiment of the present disclosure.

Referring to FIG. 5, it is assumed that an electronic device 100 includes a reception control list, e.g., a blacklist for rejecting an incoming call and/or a white list for accepting an incoming call.

In operation 501, the electronic device 100 connects to a first network (e.g., an LTE network).

In operation 503, the electronic device 100, being connected to the first network, (e.g., the LTE network) receives incoming call information of a second network (e.g., a CS service network).

In operation 505, the electronic device 100, being connected to the first network, obtains caller identification information (e.g., the caller phone number) of the incoming call information of the second network.

In operation 507, the electronic device 100, being connected to the first network, determines whether the caller identification information (the caller identification information acquired in operation 405) of the second network is included in a reception control list (e.g., a blacklist).

When the caller identification information of the second network is included in the reception control list, the electronic device 100 maintains the first network connection in operation 509. For example, when detecting the input information corresponding to an incoming call rejection, the electronic device 100 maintains the LTE service without having to connect the call of the CS service network.

When the caller identification information of the second network is not included in the reception control list, the electronic device 100 connects the voice call by connecting to the second network in operation 511. For example, to connect the call of the CS service network, the electronic device releases the LTE network connection and connects to the CS service network.

The electronic device 100 can additionally or alternatively include a reception control list (e.g., a white list) for accepting an incoming call. In this case, when the caller identification information of the second network (e.g., the CS service network) is included in the reception control list (e.g., the white list), the electronic device 100 connects to the voice call by connecting the second network. When the caller identification information of the second network is not included in the reception control list, the electronic device 100 can maintain the connection to the first network (e.g., the LTE network).

Using the CSFB, the electronic device 100 determines whether to connect the call while maintaining an LTE network connection as shown in FIG. 6 through FIG. 13.

Figure 6:
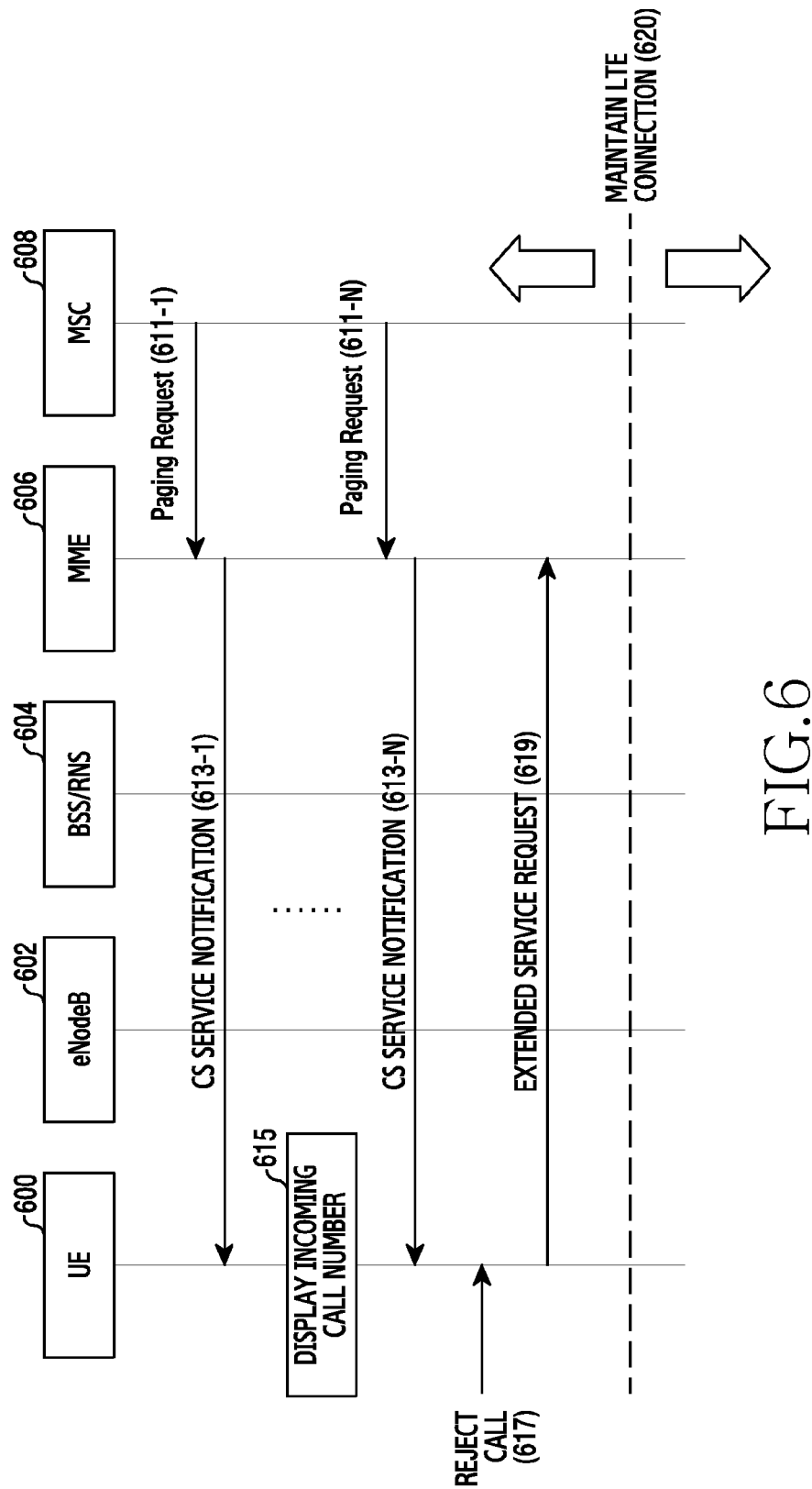
FIG. 6 is a signal flow diagram illustrating a call connection restriction based on input information in an enterprise mobility management (EMM) connected mode using Circuit Switched Fall Back (CSFB), according to an embodiment of the present disclosure.

FIG. 6 is a signal flow diagram illustrating a call connection restriction based on input information in an enterprise mobility management (EMM) connected mode using Circuit Switched Fall Back (CSFB), according to an embodiment of the present disclosure.

Referring to FIG. 6, in the EMM connected mode, an electronic device 100 using the CSFB transmits and receives data over an LTE network. The LTE network includes a user equipment (UE) 600, an evolved node B (eNB) 602 (e.g., a base station), a base station system (BSS)/radio network system (RNS) 604, a mobility management entity (MME) 606, and a mobile switching center (MSC) 608. The LTE network can omit at least one of the components or further include another component.

The UE 600 (i.e., the electronic device 100) provides LTE service by connecting the LTE network via the eNB 602. For example, the UE 600 transmits and receives data for the LTE service via the eNB 602.

When receiving a CS service network call for the UE 600, the MSC 608 sends a paging request message 611-1 to the MME 606. When the UE 600 operates in the EMM connected mode, the MME 606 generates a CS service notification message corresponding to the paging request message of the UE 600. The MME 606 sends the CS service notification message 613-1 to the UE 600 via the BSS/RNS 604 and the eNB 602.

When receiving no response message (e.g., an extended service request message) of the CS service notification message from the UE 600, the LTE network entity repeatedly sends the paging request message (e.g., the paging request message 611-N and the CS service notification message 613-N). For example, when repeatedly sending the paging request message up to a reference number of times (e.g., N) and still receiving no response message, the LTE network entity determines that the call connection to the UE 600 is limited.

The UE 600 displays caller identification information 615 obtained from the CS service notification message on the display (i.e., display 160) while maintaining the LTE network connection 620. For example, the UE 600 obtains the caller identification information recorded in calling line identification (CLI) of the CS service notification message. When detecting no input information corresponding to the caller identification information or when repeatedly receiving the CS service notification message, the UE 600 maintains the display of the caller identification information.

When detecting the input information corresponding to an incoming call rejection 617 in relation to the caller identification information displayed on the display 160, the UE 600 sends an extended service request message 619 including the incoming call reject information, to the MME 606 via the eNB 602 and the BSS/RNS 604. The UE 600 sets a CSRF response type of the extended service request message to "reject".

The UE 600 suspends the response message transmission of the CS service notification message until the input information for the displayed caller identification information is detected. The UE 600 continues the LTE service 620 by sending the extended service request message including the incoming call reject information to the MME 606.

Figure 7:
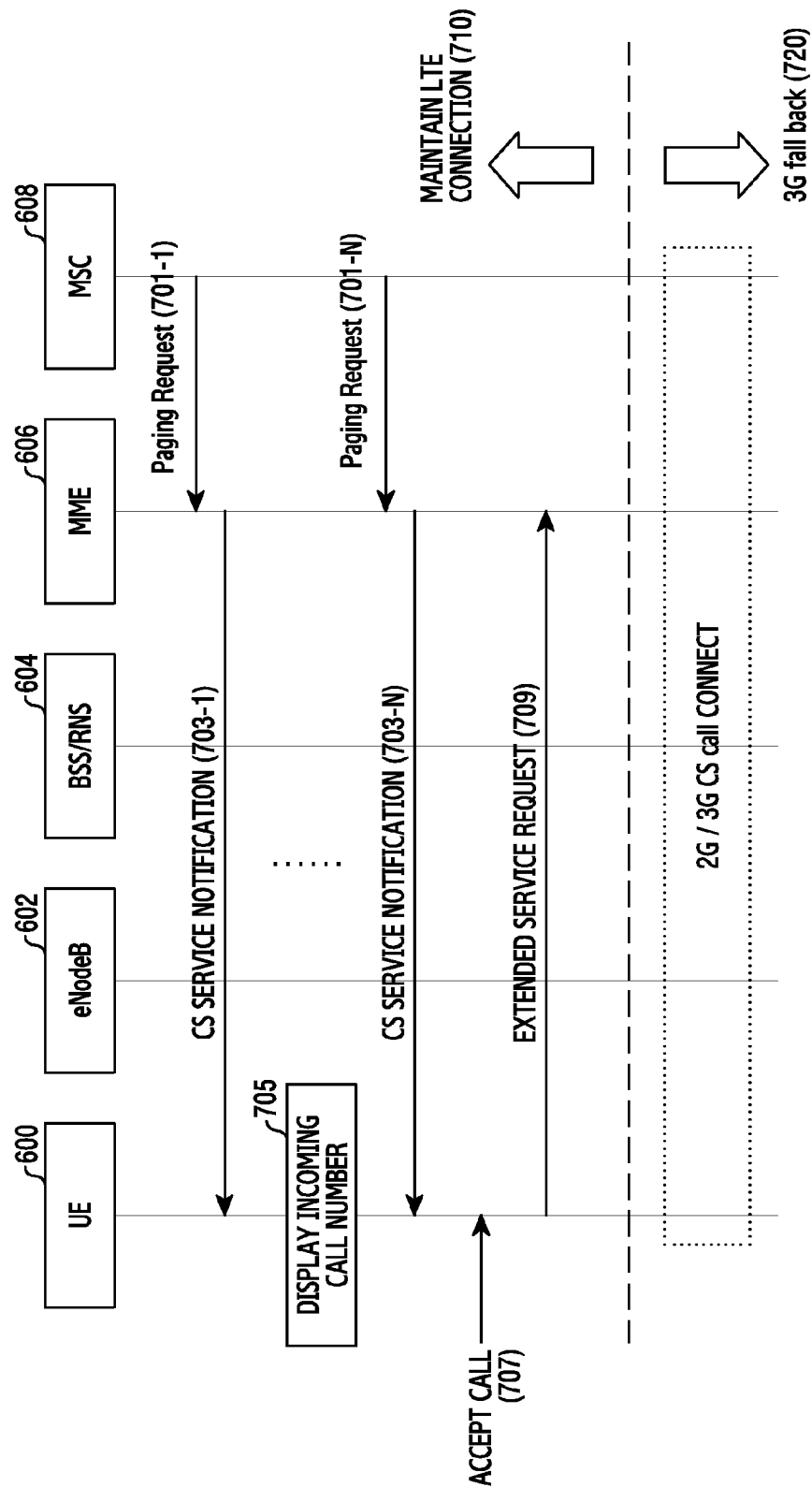
FIG. 7 is a signal flow diagram illustrating a call connection acceptance based on input information in an EMM connected mode using CSFB, according to an embodiment of the present disclosure.

FIG. 7 is a signal flow diagram illustrating a call connection acceptance based on input information in an EMM connected mode using CSFB, according to an embodiment of the present disclosure.

Referring to FIG. 7, when receiving a CS service network call for the UE 600, the MSC 608 sends a paging request message 701-1 to the MIME 606. The MME 606 sends a CS service notification message 703-1 corresponding to the paging request message of the UE 600, to the UE 600 via the BSS/RNS 604 and the eNB 602.

When receiving no response message (e.g., an extended service request message) of the CS service notification message from the UE 600, an LTE network entity repeatedly sends the paging request message (e.g., the paging request message 701-N and the CS service notification message 703-N).

The UE 600 displays caller identification information 705 obtained from the CS service notification message on the display 160 while maintaining the LTE network connection. For example, the UE 600 obtains the caller identification information recorded in CLI of the CS service notification message. When detecting no input information corresponding to the caller identification information or when repeatedly receiving the CS service notification message, the UE 600 maintains the display of the caller identification information.

When detecting the input information corresponding to an incoming call acceptance 707 in relation to the caller identification information displayed on the display, the UE 600 sends an extended service request message 709 including incoming call accept information, to the MME 606 via the eNB 602 and the BSS/RNS 604. For example, the UE 600 sets a CSRF response type of the extended service request message to "accept".

In response to the input information corresponding to the incoming call acceptance, the UE 600 hands over the incoming call to the CS service network (e.g., the 2G/3G network) and connects the call 720.

The UE 600 suspends the response message transmission of the CS service notification message until the input information for the displayed caller identification information is detected. Hence, the UE 600 continues the LTE service 710 until detecting the input information corresponding to the incoming call acceptance.

Figure 8:
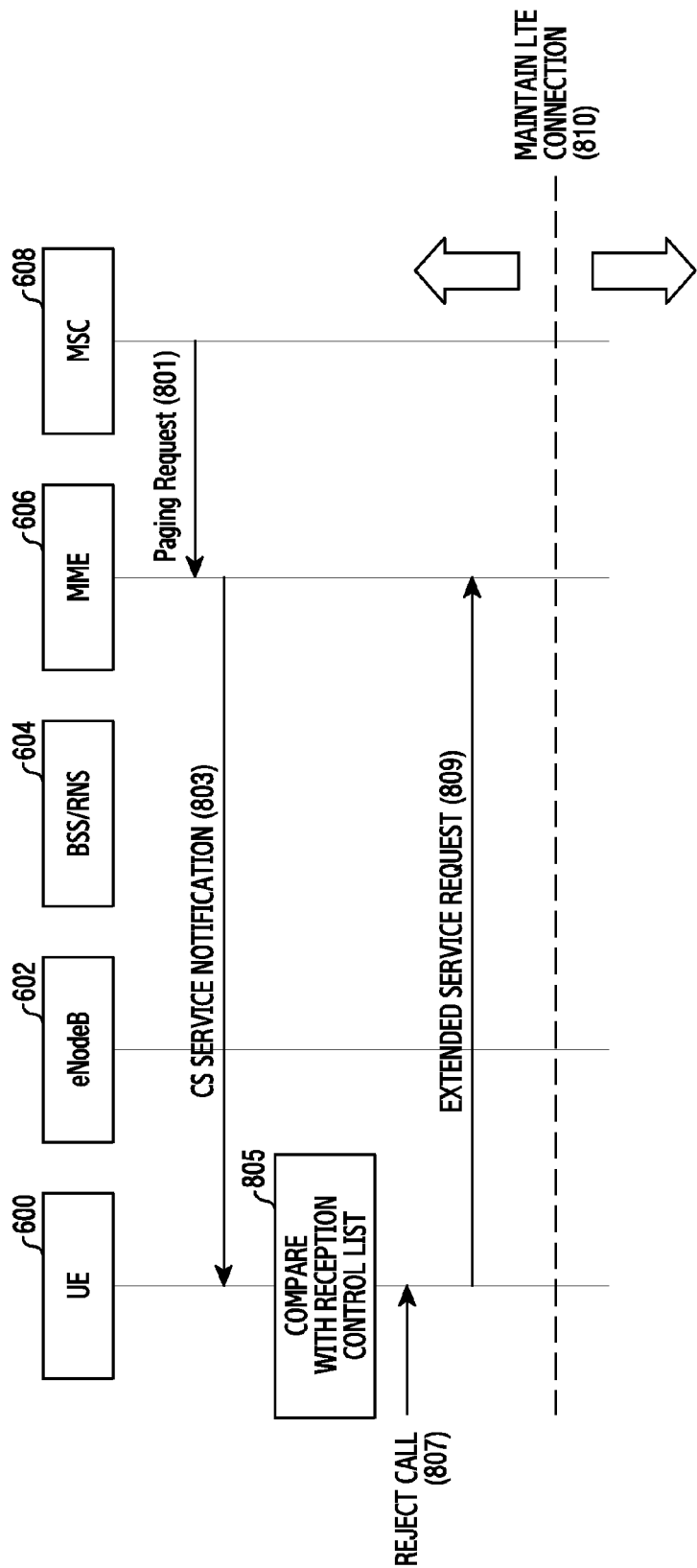
FIG. 8 is a signal flow diagram illustrating a call connection restriction based on connection priority of caller identification information in an EMM connected mode using CSFB, according to an embodiment of the present disclosure.

FIG. 8 is a signal flow diagram illustrating a call connection restriction based on connection priority of caller identification information in an EMM connected mode using CSFB, according to an embodiment of the present disclosure.

Referring to FIG. 8, when receiving a CS service network call for the UE 600, the MSC 608 sends a paging request message 801 to the MME 606. The MME 606 sends a CS service notification message 803 corresponding to the paging request message of the UE 600, to the UE 600 via the BSS/RNS 604 and the eNB 602.

In an LTE network connection 810, the UE 600 compares caller identification information obtained from the CS service notification message with a reception control list 805. For example, the UE 600 determines whether the caller identification information is included in the reception control list by comparing the caller identification information and the reception control list.

When rejecting an incoming call 807 based on the comparison of the caller identification information and the reception control list, the UE 600 sends an extended service request message 809 including the incoming call reject information, to the MME 606 via the eNB 602 and the BSS/RNS 604. For example, when the caller identification information is included in a first reception control list (e.g., a blacklist), the UE 600 determines to reject the incoming call. Alternatively, when the caller identification information is not included in a second reception control list (e.g., a white list), the UE 600 determines to reject the incoming call.

The UE 600 continues the LTE service 810 by sending the incoming call reject information as the response message of the CS service notification message.

Figure 9:
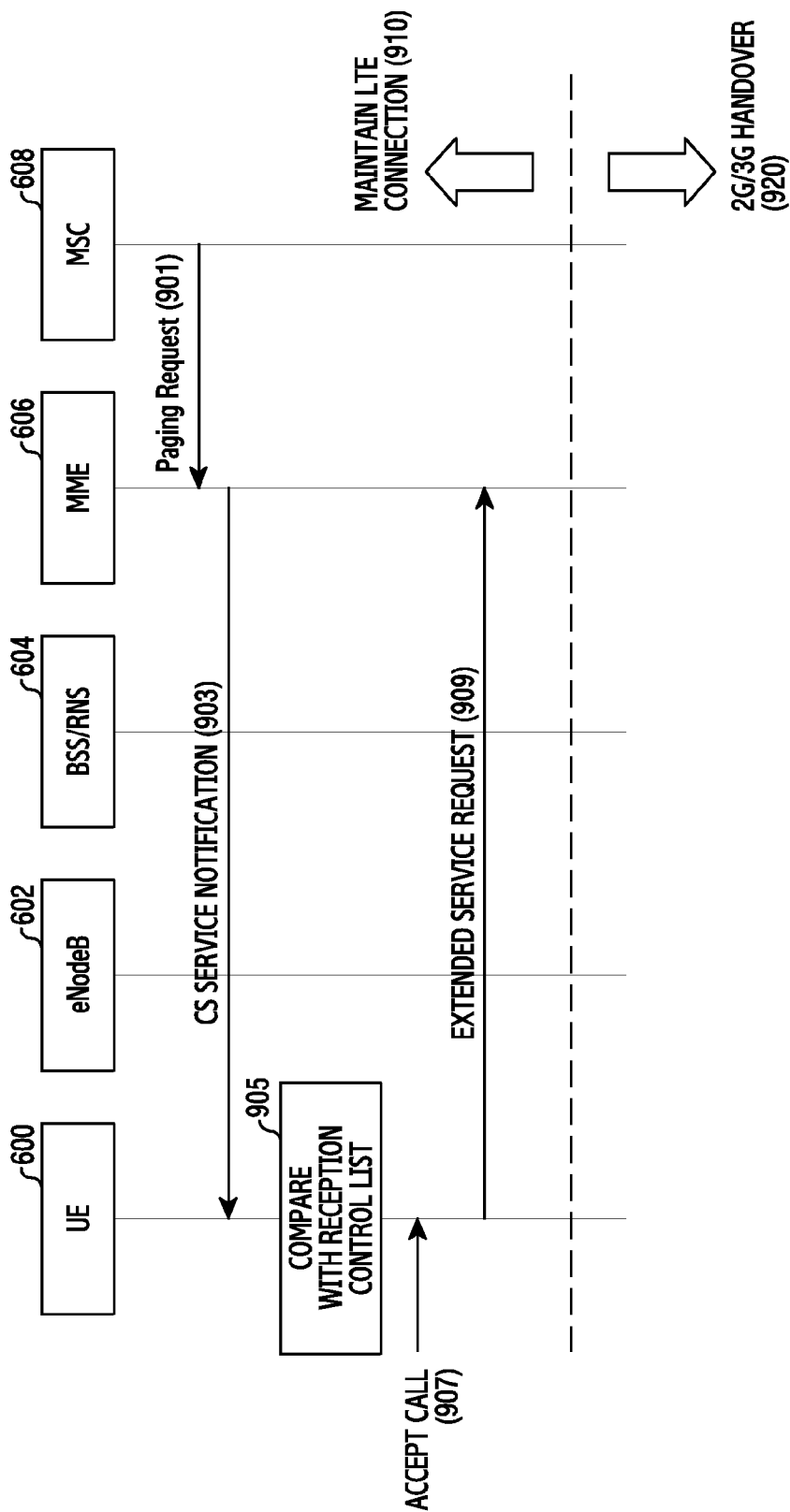
FIG. 9 is a signal flow diagram illustrating a call connection acceptance based on connection priority of caller identification information in an EMM connected mode using CSFB, according to an embodiment of the present disclosure.

FIG. 9 is a signal flow diagram illustrating a call connection acceptance based on connection priority of caller identification information in an EMM connected mode using CSFB, according to an embodiment of the present disclosure.

Referring to FIG. 9, when receiving a CS service network call for the UE 600, the MSC 608 sends a paging request message 901 to the MME 606. The MME 606 sends a CS service notification message 903 corresponding to the paging request message of the UE 600, to the UE 600 via the BSS/RNS 604 and the eNB 602.

In an LTE network connection 910, the UE 600 compares caller identification information obtained from the CS service notification message with a reception control list 905. For example, the UE 600 determines whether the caller identification information is included in the reception control list by comparing the caller identification information and the reception control list.

When accepting an incoming call 907 based on the comparison of the caller identification information and the reception control list, the UE 600 sends an extended service request message 909 including the incoming call accept information, to the MME 606 via the eNB 602 and the BSS/RNS 604. For example, when the caller identification information is not included in a first reception control list (e.g., a blacklist), the UE 600 determines to accept the incoming call. Alternatively, when the caller identification information is included in a second reception control list (e.g., a white list), the UE 600 determines to accept the incoming call.

In response to input information corresponding to the incoming call acceptance, the UE 600 hands over the incoming call to the CS service network (e.g., the 2G/3G network) and connect the call 920.

Figure 10:
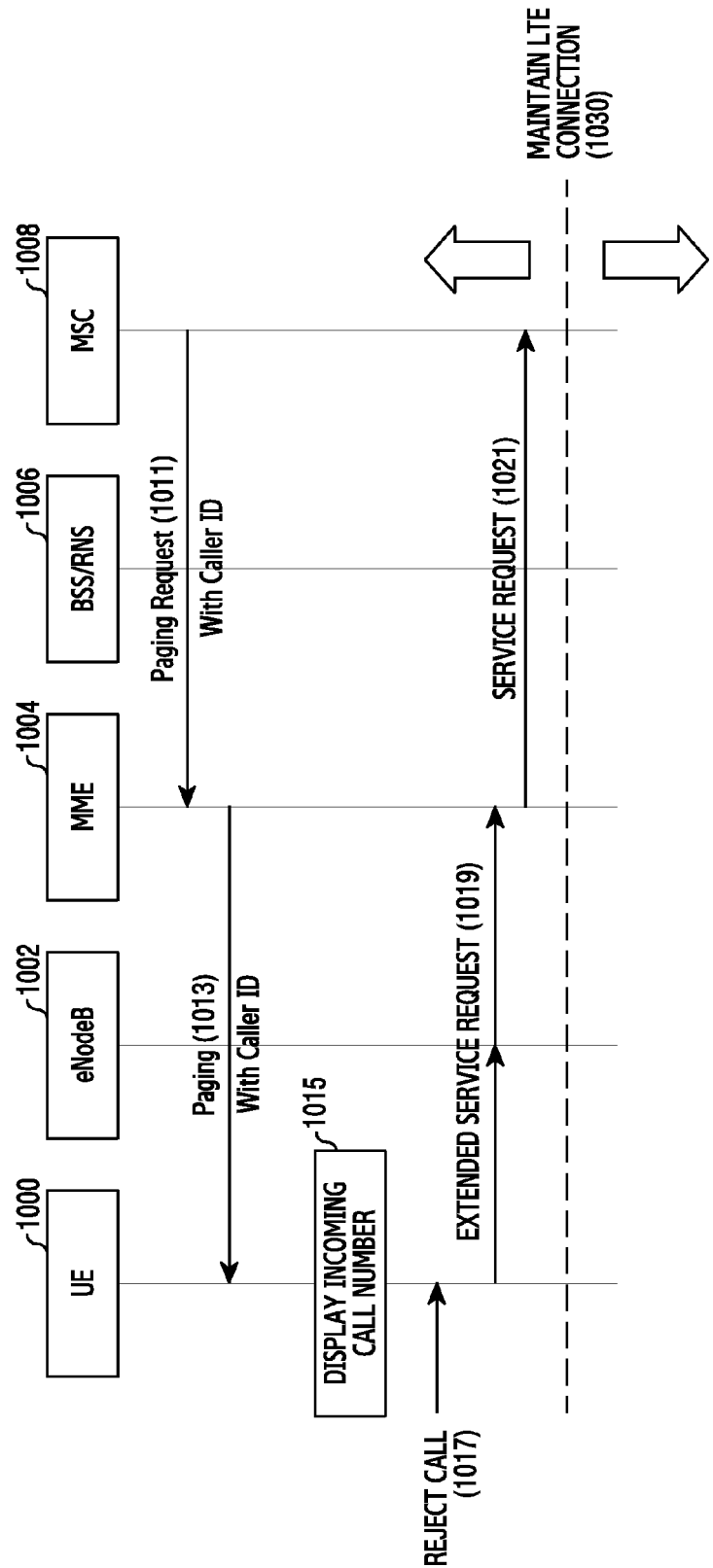
FIG. 10 is a signal flow diagram illustrating a call connection restriction based on input information in an EMM idle mode using CSFB, according to an embodiment of the present disclosure.

FIG. 10 is a signal flow diagram illustrating a call connection restriction based on input information in an EMM idle mode using CSFB, according to an embodiment of the present disclosure. Referring to FIG. 10, in the EMM idle mode, an electronic device 100 using the CSFB does not transmit and receive data over an LTE network. The LTE network includes a UE 1000, an eNB 1002 (e.g., a base station), an MME 1004, a BSS/RNS 1006, and an MSC 1008. The LTE network can omit at least one of the components or further include another component.

The UE 1000 (i.e., the electronic device 100) connects to the LTE network via the eNB 1002.

When receiving a CS service network call for the UE 1000, the MSC 1008 sends a paging request message 1011 to the MME 1004. When the UE 1000 operates in the EMM idle mode, the MME 1004 forwards the paging request message 1013 of the UE 1000 to the UE 1000 via the eNB 1002. The paging request message includes caller identification information.

When receiving no response message (e.g., an extended service request message or a paging response message) of the paging request message from the UE 1000, the LTE network entity repeatedly sends the paging request message. For example, when repeatedly sending the paging request message up to a reference number of times (e.g., N) and still receiving no response message, the LTE network entity determines that the call connection to the UE 1000 is limited.

The UE 1000 displays the caller identification information 1015 obtained from the paging request message on the display 160 while maintaining the LTE network connection 1030. For example, when detecting no input information corresponding to the caller identification information or when repeatedly receiving the paging request message, the UE 1000 maintains the display of the caller identification information.

When detecting the input information corresponding to an incoming call rejection 1017 in relation to the caller identification information displayed on the display 160, the UE 1000 sends an extended service request message 1019 including the incoming call reject information, to the MME 1004 via the eNB 1002. For example, the UE 1000 sets a CSRF response type of the extended service request message to "reject".

In response to the extended service request message, the MME 1004 sends a service request message 1021 to the MSC 1008.

The UE 1000 suspends the paging response message transmission until the input information for the displayed caller identification information is detected. The UE 1000 continues the LTE service 1030 by sending the extended service request message including the incoming call reject information.

Figure 11:
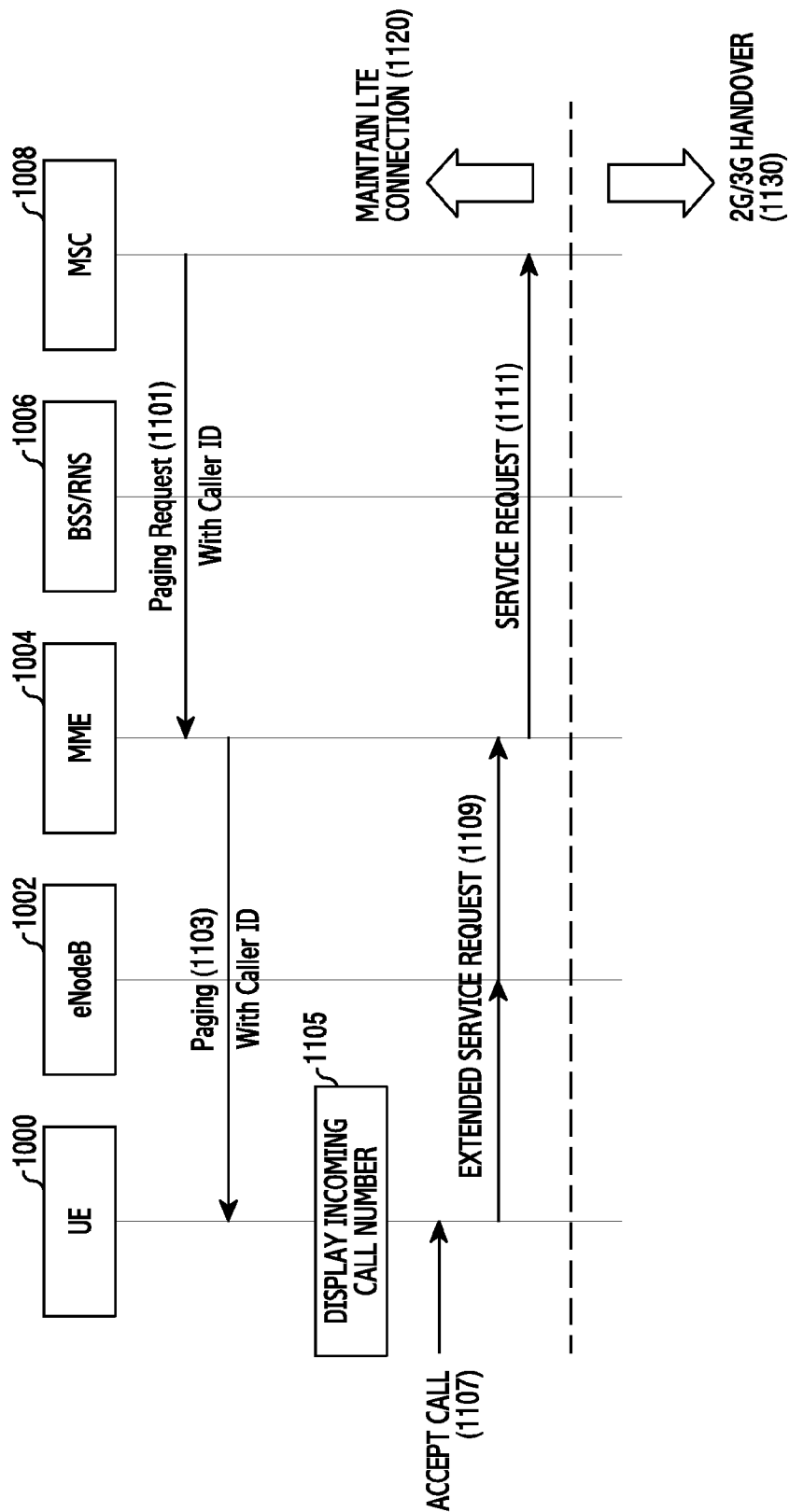
FIG. 11 is a signal flow diagram illustrating a call connection acceptance based on input information in an EMM idle mode using CSFB, according to an embodiment of the present disclosure.

FIG. 11 is a signal flow diagram illustrating a call connection acceptance based on input information in an EMM idle mode using CSFB, according to an embodiment of the present disclosure.

When receiving a CS service network call for the UE 1000, the MSC 1008 sends a paging request message 1101 to the MME 1004. The MME 1004 forwards the paging request message 1103 of the UE 1000 to the UE 1000 via the eNB 1002. The paging request message includes the caller identification information (e.g., a caller phone number).

When receiving no response message (e.g., an extended service request message or a paging response message) of the paging request message from the UE 1000, an LTE network entity repeatedly sends the paging request message.

The UE 1000 displays caller identification information 1105 obtained from the paging request message on the display while maintaining the LTE network connection 1120.

When detecting input information corresponding to an incoming call acceptance 1107 in relation to the caller identification information displayed on the display, the UE 1000 sends an extended service request message 1109 including the incoming call accept information, to the MME 1004 via the eNB 1002. For example, the UE 1000 sets a CSRF response type of the extended service request message to "accept".

In response to the input information corresponding to the incoming call acceptance 1107, the UE 1000 hands over the incoming call to the CS service network (e.g., the 2G/3G network) and connect the call 1130.

In response to the extended service request message, the MME 1004 sends a service request message 1111 to the MSC 1008.

The UE 1000 suspends the response message transmission of the CS service notification message until the input information for the displayed caller identification information is detected. Hence, the UE 1000 continues the LTE service 1120 until detecting the input information corresponding to the incoming call acceptance.

Figure 12:
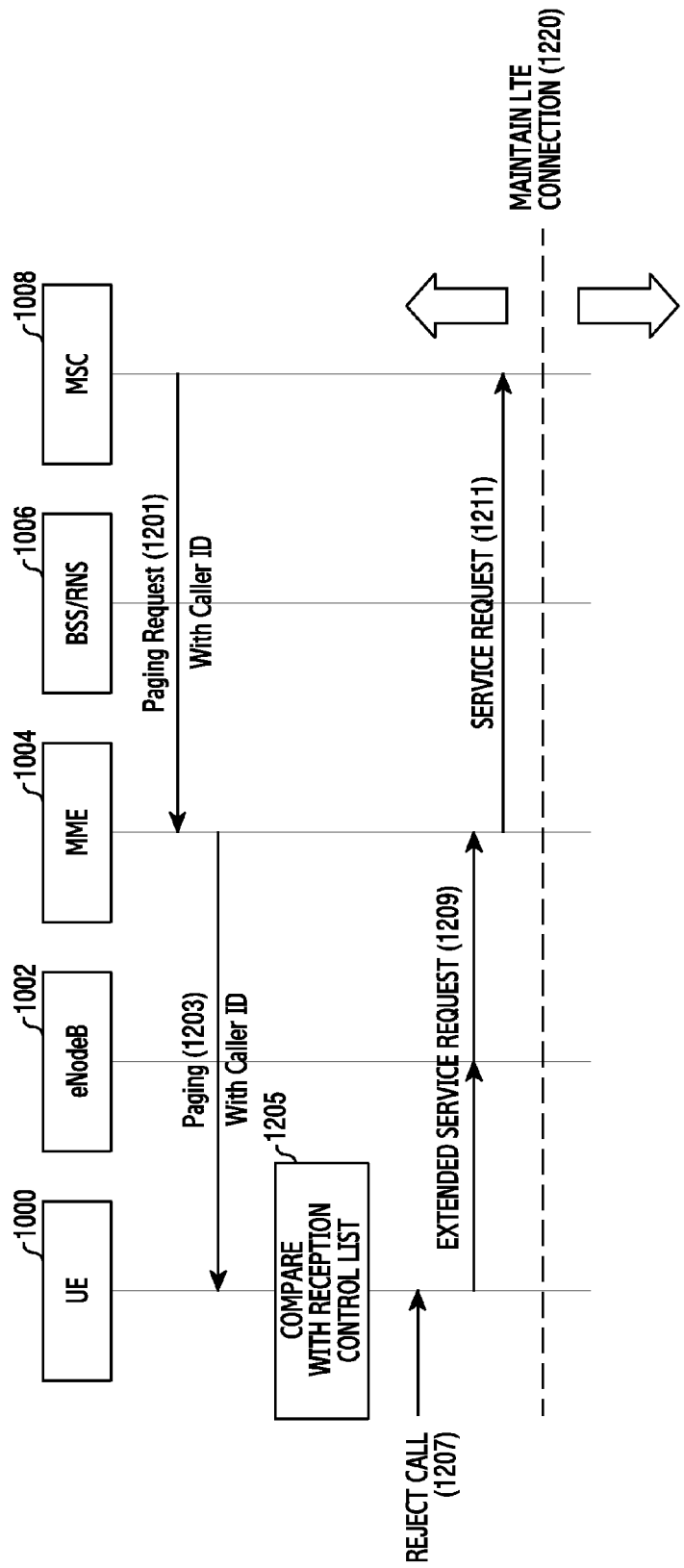
FIG. 12 is a signal flow diagram illustrating a call connection restriction based on connection priority of caller identification information in an EMM idle mode using the CSFB, according to an embodiment of the present disclosure.

FIG. 12 is a signal flow diagram illustrating a call connection restriction based on connection priority of caller identification information in an EMM idle mode using CSFB, according to an embodiment of the present disclosure.

Referring to FIG. 12, when receiving a CS service network call for the UE 1000, the MSC 1008 sends a paging request message 1201 to the MME 1004. The MME 1004 forwards the paging request message 1203 of the UE 1000 to the UE 1000 via the eNB 1002. The paging request message includes caller identification information (e.g., a caller phone number).

In an LTE network connection 1220, the UE 1000 compares the caller identification information obtained from the paging request message with a reception control list 1205.

When rejecting an incoming call 1207 based on the comparison of the caller identification information and the reception control list, the UE 1000 sends an extended service request message 1209 including the incoming call reject information, to the MME 1004 via the eNB 1002.

In response to the extended service request message, the MME 1004 sends a service request message 1211 to the MSC 1008.

The UE 1000 continues the LTE service 1220 by sending the incoming call reject information in response to the paging request message.

Figure 13:
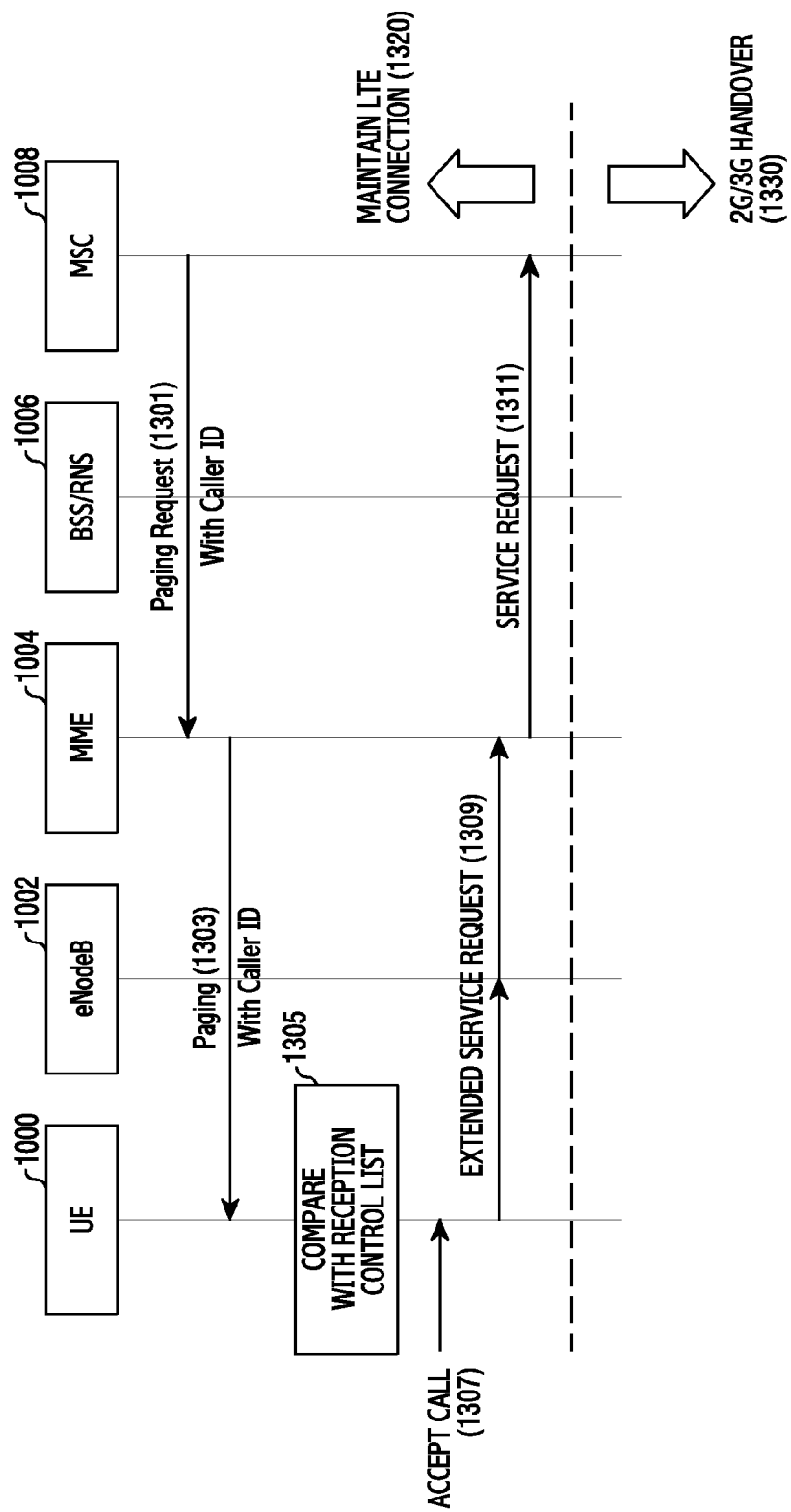
FIG. 13 is a signal flow diagram illustrating a call connection acceptance based on connection priority of caller identification information in an EMM idle mode using the CSFB, according to an embodiment of the present disclosure.

FIG. 13 is a signal flow diagram illustrating a call connection acceptance based on connection priority of caller identification information in an EMM idle mode using CSFB, according to an exemplary embodiment of the present disclosure.

Referring to FIG. 13, when receiving a CS service network call for the UE 1000, the MSC 1008 sends a paging request message 1301 to the MME 1004. The MME 1004 forwards the paging request message 1303 of the UE 1000 to the UE 1000 via the eNB 1002.

In an LTE network connection 1320, the UE 1000 compares the caller identification information obtained from the paging request message with a reception control list 1305.

When accepting an incoming call 1307 based on the comparison of the caller identification information and the reception control list, the UE 1000 sends an extended service request message 1309 including the incoming call accept information, to the MME 1004 via the eNB 1002. For example, when the caller identification information is not included in a first reception control list (e.g., a blacklist), the UE 1000 determines to accept the incoming call. Alternatively, when the caller identification information is included in a second reception control list (e.g., a white list), the UE 1000 determines to accept the incoming call.

In response to input information corresponding to the incoming call acceptance, the UE 1000 hands over the incoming call to the CS service network (e.g., the 2G/3G network) and connects the call 1330.

In response to the extended service request message, the MME 1004 sends a service request message 1311 to the MSC 1008.

Using the SRLTE or the SRDS, an electronic device 100 determines whether to connect the call while maintaining an LTE network connection as shown in FIG. 14 through FIG. 17.

Figure 14:
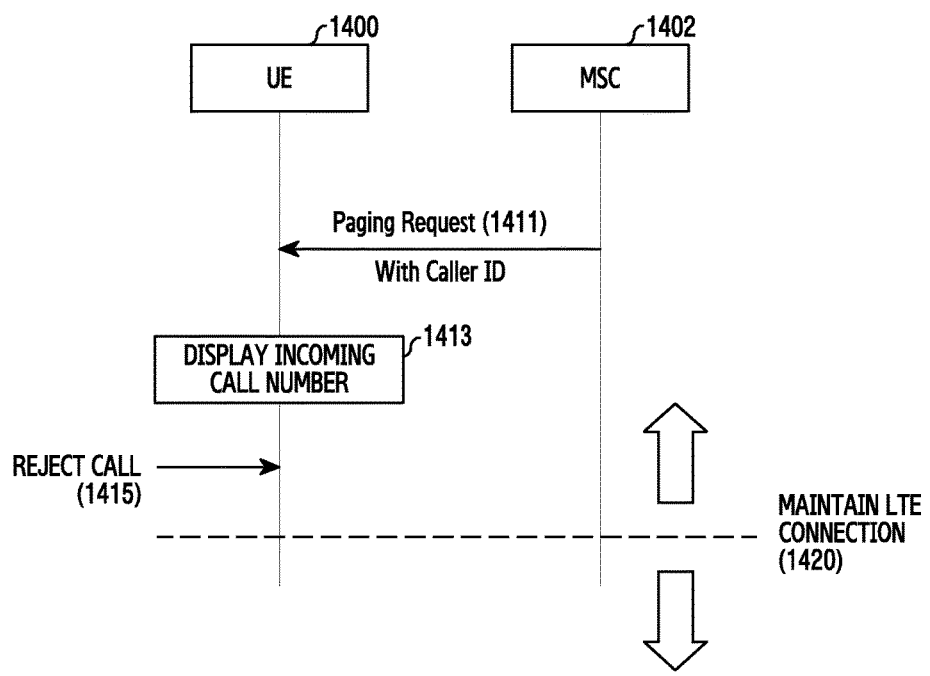
FIG. 14 is a signal flow diagram illustrating a call connection restriction based on input information using Single Radio Long Term Evolution (SRLTE)/Single Radio Dual System (SRDS), according to an embodiment of the present disclosure.

FIG. 14 is a signal flow diagram illustrating a call connection restriction based on input information using SRLTE/SRDS, according to an embodiment of the present disclosure.

Referring to FIG. 14, a UE 1400 (i.e., the electronic device 100) provides LTE service by connecting to an LTE network. For example, the UE 1400 transmits and receives data for LTE service by connecting to the LTE network.

The UE 1400 determines whether incoming call information is periodically received over a CS service network (e.g., a 2G/3G network). For example, using the SRLTE, the UE 1400 switches every radio resource (e.g., receive antennas) to the CS service network and determines whether the incoming call information for the CS service network is received. For example, using the SRDS, the UE 1400 switches some radio resources (e.g., receive antennas) to the CS service network and determines whether the incoming call information for the CS service network is received.

Upon receiving a CS service network call for the UE 1400, an MSC 1402 sends a paging request message 1411 to the UE 1400 over the CS service network. The paging request message includes caller identification information.

The UE 1400 displays the caller identification information 1413 obtained from the paging request message on the display 160 while maintaining the LTE network connection 1420.

When detecting input information corresponding to the incoming call rejection 1415 in relation to the caller identification information displayed on the display 160, the UE 1400 restricts the paging response message transmission.

The UE 1400 suspends the paging response message transmission until the input information for the displayed caller identification information is detected. The UE 1400 continues the LTE service 1420 by restricting the paging response message transmission in response to the incoming call rejection.

When detecting the input information corresponding to the incoming call rejection in relation to the caller identification information displayed on the display 160, the UE 1400 sends a response message including the incoming call reject information to the MME 1402 over the CS service network.

Figure 15:
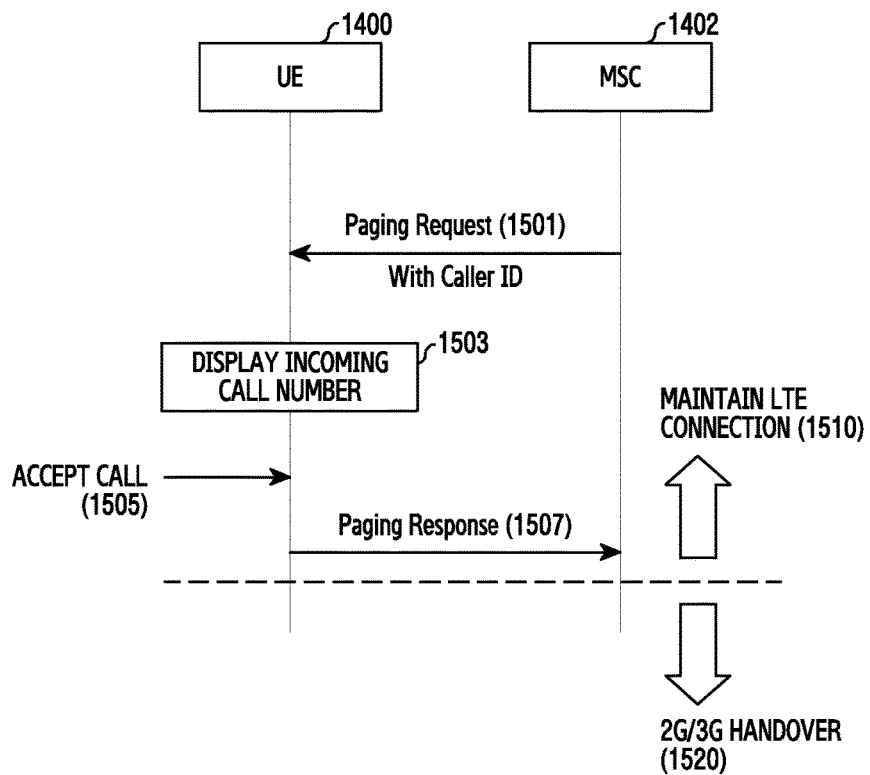
FIG. 15 is a signal flow diagram illustrating a call connection acceptance based on input information using SRLTE/SRDS, according to an embodiment of the present disclosure.

FIG. 15 is a signal flow diagram illustrating a call connection acceptance based on input information using SRLTE/SRDS, according to an embodiment of the present disclosure.

When receiving a CS service network call for the UE 1400, an MSC 1402 sends a paging request message 1501 to the UE 1400 over the CS service network. The paging request message includes caller identification information.

The UE 1400 displays the caller identification information 1503 obtained from the paging request message on the display 160 while maintaining an LTE network connection 1510.

When detecting input information corresponding to an incoming call acceptance 1505 in relation to the caller identification information displayed on the display 160, the UE 1400 sends a paging response message 1507 to the MME 1402 over the CS service network.

In response to the input information corresponding to the incoming call acceptance, the UE 1400 hands over the incoming call to the CS service network (e.g., the 2G/3G network) and connects the call 1520.

The UE 1400 suspends the paging response message transmission until the input information for the displayed caller identification information is detected. The UE 1400 continues the LTE service 1510 until the input information corresponding to the incoming call acceptance is detected.

When detecting input information corresponding to the incoming call rejection in relation to the caller identification information displayed on the display 160, the UE 1400 sends a response message including the incoming call reject information to the MSC 1402 over the CS service network.

Figure 16:
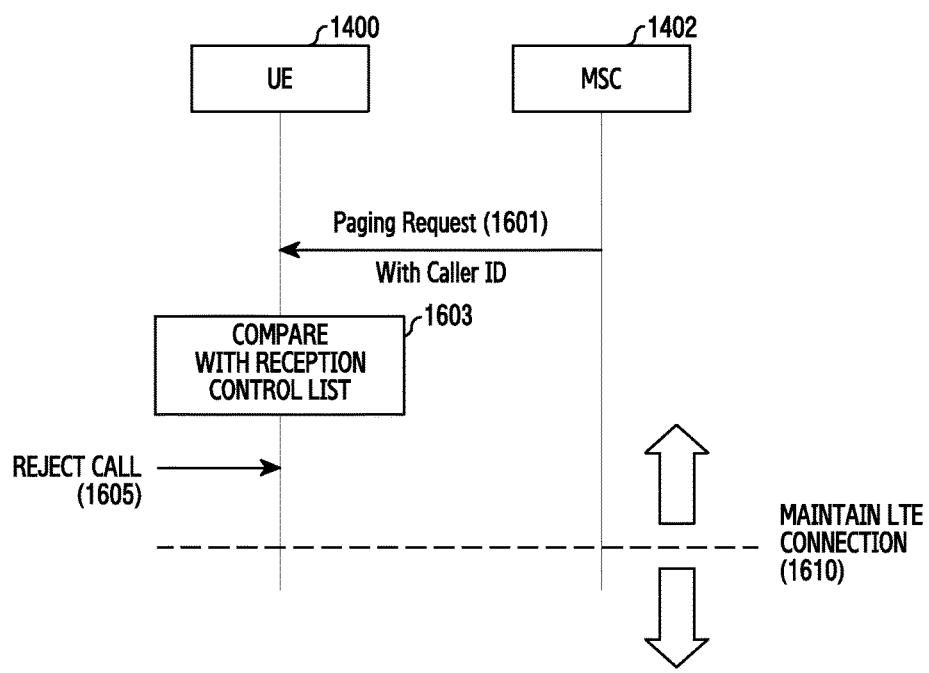
FIG. 16 is a signal flow diagram illustrating a call connection restriction based on connection priority of caller identification information using SRLTE/SRDS, according to an embodiment of the present disclosure.

FIG. 16 is a signal flow diagram illustrating a call connection restriction based on connection priority of caller identification information using SRLTE/SRDS, according to an embodiment of the present disclosure.

Referring to FIG. 16, when receiving a CS service network call for the UE 1400, the MSC 1402 sends a paging request message 1601 to the UE 1400 over the CS service network. The paging request message includes caller identification information.

In an LTE network connection 1610, the UE 1400 compares the caller identification information obtained from the paging request message with a reception control list 1603.

When rejecting an incoming call 1605 based on the comparison of the caller identification information and the reception control list, the UE 1400 restricts the paging response message transmission.

The UE 1400 continues the LTE service 1610 by restricting the paging response message transmission in response to the incoming call rejection.

Figure 17:
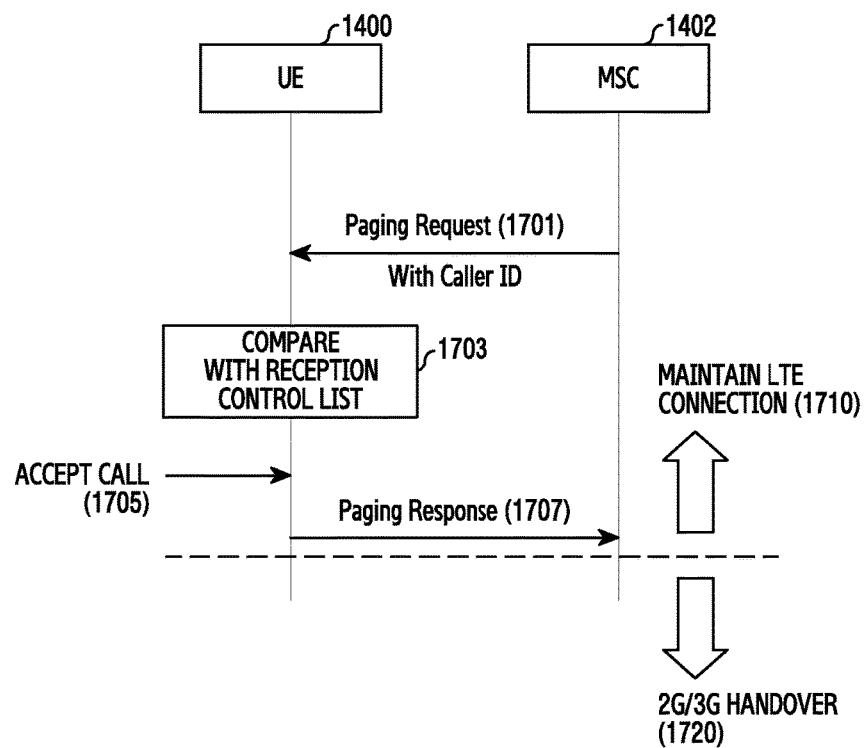
FIG. 17 is a signal flow diagram illustrating a call connection acceptance based on connection priority of caller identification information using SRLTE/SRDS, according to an embodiment of the present disclosure.

FIG. 17 is a signal flow diagram illustrating a call connection acceptance based on connection priority of caller identification information using SRLTE/SRDS, according to an embodiment of the present disclosure.

Referring to FIG. 17, when receiving a CS service network call for the UE 1400, the MSC 1402 sends a paging request message 1701 to the UE 1400 over the CS service network. The paging request message includes caller identification information.

In an LTE network connection 1710, the UE 1400 compares the caller identification information obtained from the paging request message with a reception control list in operation 1703.

When accepting an incoming call 1705 based on the comparison of the caller identification information and the reception control list, the UE 1400 sends a paging response message 1707 to the MSC 1402 over the CS service network.

In response to input information corresponding to the incoming call acceptance, the UE 1400 hands over the incoming call to the CS service network (e.g., the 2G/3G network) and connects the call 1720.

Figure 18:
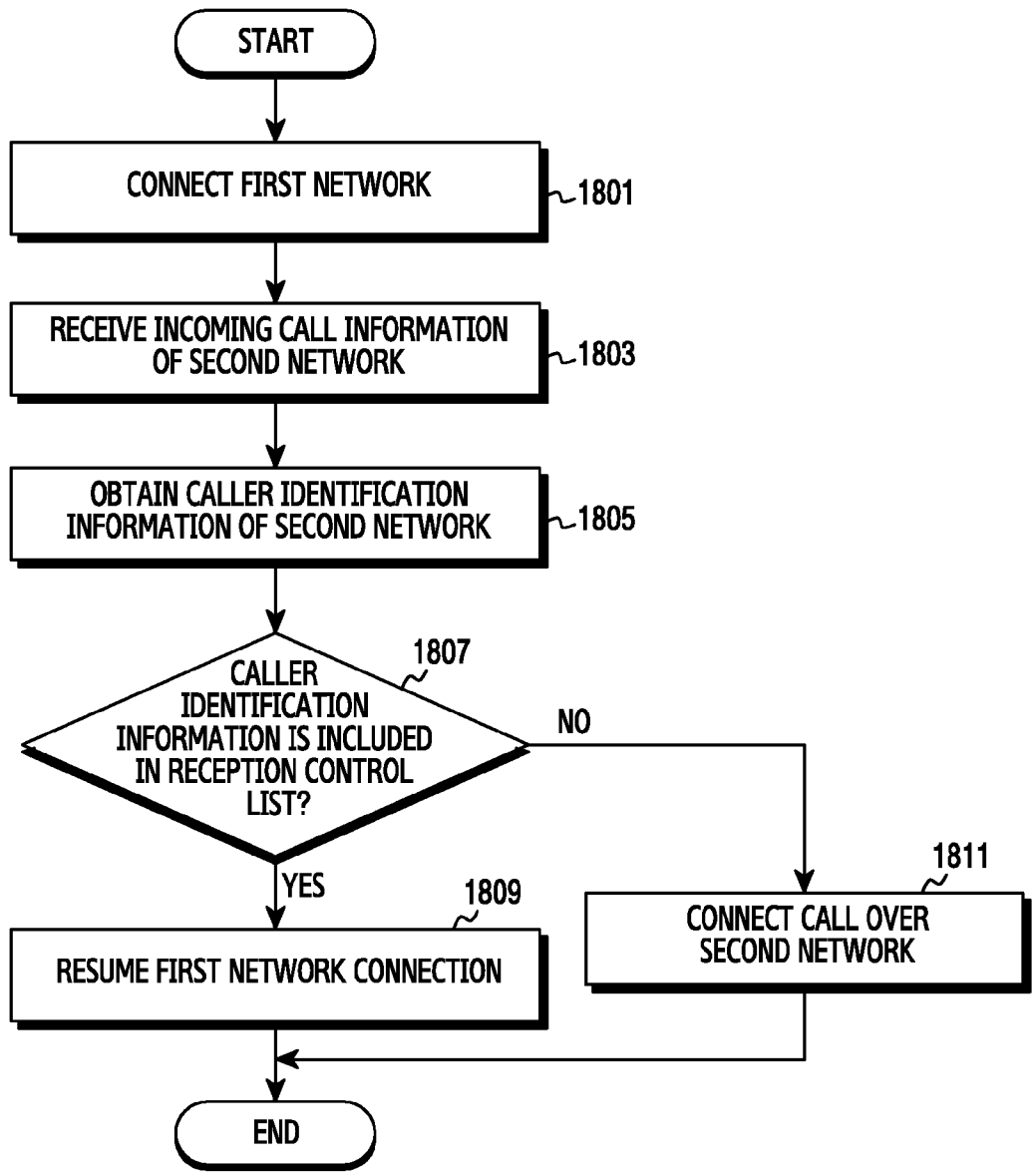
FIG. 18 is a flowchart illustrating a method for determining whether to connect a call in an electronic device using SRLTE/SRDS, according to an embodiment of the present disclosure.

FIG. 18 is a flowchart illustrating a method for determining whether to connect a call in an electronic device using SRLTE/SRDS, according to an embodiment of the present disclosure.

Referring to FIG. 18, it is assumed that an electronic device 100 has a reception control list (e.g., a blacklist) for rejecting an incoming call. In operation 1801, the electronic device 100 connects to a first network (e.g., an LTE network).

In operation 1803, the electronic device 100 being connected to the first network (e.g., the LTE network) receives incoming call information (e.g., a paging request message) of a second network over the second network (e.g., a CS service network). For example, using the SRLTE or the SRDS, the electronic device 100 periodically switches all or at least part of the radio resources (e.g., receive antennas) to the CS service network and determines whether the incoming call information of the CS service network is received.

In operation 1805, the electronic device 100 connects to the second network and obtains caller identification information (e.g., the caller phone number) of the incoming call information of the second network. For example, when receiving the paging request message over the second network, the electronic device 100 sends the paging response message over the second network. The electronic device 100 connects to the second network and receives a CC setup message over the second network. The electronic device 100 obtains the caller identification information in the CC setup message. In so doing, the electronic device 100 releases the LTE network connection.

In operation 1807, the electronic device 100 determines whether the caller identification information (the caller identification information acquired in operation 1805) of the second network is included in a reception control list (e.g., a blacklist).

When the caller identification information of the second network is included in the reception control list, the electronic device 100 resumes the first network connection in operation 1809.

When the caller identification information of the second network is not included in the reception control list, the electronic device 100 connects the voice call of the second network in operation 1811.

The electronic device 100 can alternatively include a reception control list (e.g., a white list) for accepting the call. In this case, when the caller identification information of the second network (e.g., the CS service network) is included in the reception control list, the electronic device 100 connects the voice call of the second network. By contrast, when the caller identification information of the second network is not included in the reception control list, the electronic device 100 resumes the first network (e.g., the LTE network) connection.

Figure 19:
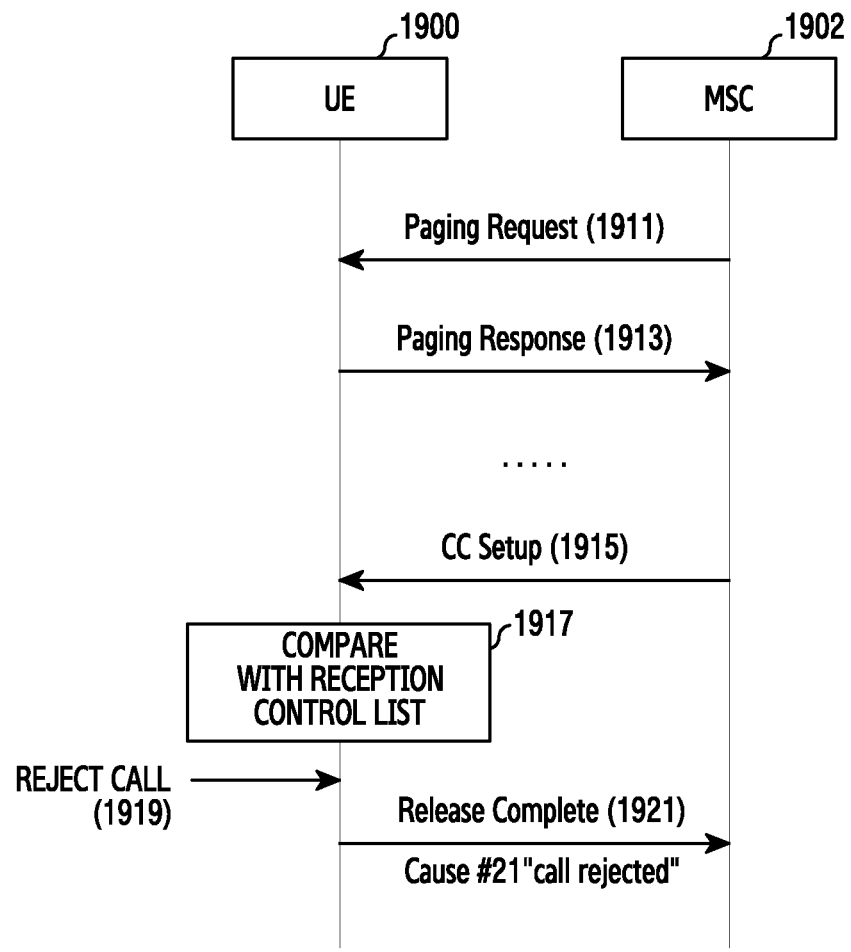
FIG. 19 is a signal flow diagram illustrating a method for restricting a call connection using SRLTE/SRDS, according to an embodiment of the present disclosure.

FIG. 19 is a signal flow diagram illustrating a call connection restriction using SRLTE/SRDS, according to an embodiment of the present disclosure.

Referring to FIG. 19, a UE 1900 (e.g., an electronic device 100) connects to an LTE network and provides LTE service. For example, the UE 1900 connects to the LTE network and transmit and receive data for the LTE service.

The UE 1900 determines whether the incoming call information is periodically received over the CS service network (e.g., the 2G/3G network).

When receiving a CS service network call for the UE 1900, an MSC 1902 sends a paging request message 1911 to the UE 1900 over the CS service network.

In response to the paging request message, the TIE 1900 sends a paging response message 1913 to the MSC 1902 over the CS service network. The UE 1900 connects to the CS service network and receives a CC setup message 1915 over the CS service network. The UE 1900 obtains caller identification information in the CC setup message.

The UE 1900 being connected to the CS service network compares the caller identification information obtained from the CC setup message, with a reception control list.

To reject an incoming call 1919 based on the comparison of the caller identification information and the reception control list, the UE 1900 sends a release complete message 1921 to the MSC 1902. For example, the UE 1900 sets a CC cause value of the release complete message to #21 "call rejected" and sends the release complete message to the MSC 1902.

In response to the incoming call rejection, the UE 1900 resumes the first network (LTE network) connection.

A method for operating an electronic device (i.e., electronic device 100 or 200) includes connecting to a first network, when being connected to the first network, receiving incoming call information of a second network, obtaining caller identification information of the incoming call information of the second network, and determining whether to connect a call based on the caller identification information.

Receiving the incoming call information includes receiving the incoming call information of the second network over the first network.

Receiving the incoming call information includes, when being connected to the first network, switching at least part of radio resources to the second network, and receiving the incoming call information of the second network over the second network.

Obtaining the caller identification information includes obtaining the caller identification information of the incoming call information, in the incoming call information of the second network.

Determining whether to connect the call includes displaying the caller identification information on a display, detecting input information corresponding to the caller identification information displayed on the display, and determining whether to connect the call based on the input information.

Determining whether to connect the call includes comparing the caller identification information with a reception control list, and determining whether to connect the call based on the comparison of the caller identification information and the reception control list.

The method further includes, when determining to reject the call connection, maintaining the first network connection.

The method further includes, when determining to accept the call connection, handing the call over to the second network, and connecting the call over the second network.

Alternatively, a method for operating an electronic device (i.e., electronic device 100 or 200) includes connecting to a first network, when being connected to the first network, receiving incoming call information of a second network, obtaining caller identification information of the incoming call information by connecting the second network, and determining whether to connect a call based on the caller identification information.

The method further includes, when determining to reject the call connection, resuming the first network connection.

The method further includes, when determining to accept the call connection, connecting the call over the second network.

As set forth above, the electronic device and its method obtains the caller identification information of the CS service network (e.g., the 2G/3G network) over the LTE network, determines whether to connect the call using the caller identification information, and thus enhances LTE data service efficiency.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module", according to the present disclosure, may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, at least some of the devices (for example, modules or functions thereof) or the method (for example, operations) may be implemented by a command stored in a computer-readable storage medium in a programming module form. When an instruction is implemented by one or more processors (for example, the processor 120), one or more processors executes a function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), etc. In addition, the program instructions may include high level language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules, according to various embodiments of the present disclosure, may include at least one of the above described elements, exclude some of the elements, or further include other additional elements. The operations performed by the modules, programming module, or other elements may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure as defined by the following claims and their equivalents.

What is claimed is:

1. A method for operating an electronic device, the method comprising: connecting to a packet switching (PS) service network; receiving information of an incoming call on a circuit switching (CS) service network, while connected to the PS service network; obtaining caller identification information of the incoming call on the CS service network based on the information of the incoming call, while connected to the PS service network; and determining whether to connect the incoming call on the CS service network based on the caller identification information while connected to the PS service network, wherein determining whether to connect the call comprises: displaying the caller identification information on a display; detecting input on the caller identification information displayed on the display; and determining whether to connect the call based on the input.

2. The method of claim 1, wherein the PS service network is capable of CS service and comprises a Long Term Evolution (LTE) network.

3. The method of claim 1, wherein the CS service network comprises at least one of a 2nd Generation (2G) network and a 3rd Generation (3G) network,
the 2G network comprises at least one of a Global System for Mobile communication (GSM) network and a Code Division Multiple Access (CDMA) network, and
the 3G network comprises at least one of a Wideband-CDMA (WCDMA) network, a Time Division-Synchronous CDMA (TD-SCDMA) network, and an Evolution-Data Optimized (EV-DO) network.

4. The method of claim 1, wherein receiving the incoming call information comprises:
receiving the information of the incoming call on the CS service network, included in a CS service notification message or a paging request message transmitted over the PS service network; and
maintaining the connection over the PS service network without transmitting an extended service request message for the incoming call.

5. The method of claim 1, wherein receiving the incoming call information comprises:
switching a radio resource to the CS service network, while connected to the PS service network; and
receiving the information of the incoming call on the CS service network over the CS service network.

6. The method of claim 1, wherein determining whether to connect the call comprises:
comparing the caller identification information with a reception control list; and
determining whether to connect the call based on the comparison of the caller identification information and the reception control list.

7. The method of claim 1, further comprising:
if determining to reject the call, maintaining the PS service network connection.

8. The method of claim 1, further comprising:
if determining to accept the call, handing the call over to the CS service network; and
connecting the call over the CS service network.

9. The method of claim 1, wherein receiving the incoming call information comprises:
receiving the information of the incoming call on the CS service network, included in a CS service notification message or a paging request message transmitted over the PS service network,
wherein the method further comprises:
if determining to reject the incoming call, transmitting an extended service request message including an incoming call rejection information.

10. A method for operating an electronic device, the method comprising:
connecting to a packet switching (PS) service network; receiving information of an incoming call on a circuit switching (CS) service network, while connected to the PS service network; obtaining caller identification information of the incoming call by connecting to the CS service network based on the information of the incoming call; and determining whether to connect the incoming call based on the caller identification information while connected to the PS service network, wherein determining whether to connect the call comprises: displaying the caller identification information on a display; detecting input on the caller identification information displayed on the display; and determining whether to connect the call based on the input.

11. The method of claim 10, wherein the PS service network is capable of CS service and comprises a Long Term Evolution (LTE) network.

12. The method of claim 10, wherein the CS service network comprises at least one of a 2nd Generation (2G) network and a 3rd Generation (3G) network,
the 2G network comprises at least one of a Global System for Mobile communication (GSM) network and a Code Division Multiple Access (CDMA) network, and
the 3G network comprises at least one of a Wideband-CDMA (WCDMA) network, a Time Division-Synchronous CDMA (TD-SCDMA) network, and an Evolution-Data Optimized (EV-DO) network.

13. The method of claim 10, wherein determining whether to connect the call comprises:
comparing the caller identification information with a reception control list; and
determining whether to connect the call based on the comparison of the caller identification information and the reception control list.

14. The method of claim 10, further comprising:
if determining to reject the call, resuming the PS service network connection.

15. The method of claim 10, further comprising:
if determining to accept the call, connecting the call over the CS service network.

16. An electronic device comprising: a communication interface configured to transmit and receive signals over a plurality of networks; and a processor configured to: connect to a packet switching (PS) service network through the communication interface, receive information of an incoming call on a circuit switching (CS) service network, while connected to the PS service network, obtain caller identification information of the incoming call on the CS service network based on the information of the incoming call, while connected to the PS service network, and determine whether to connect the incoming call based on the caller identification information while connected to the PS network, wherein determining whether to connect the call comprises: displaying the caller identification information on a display; detecting input on the caller identification information displayed on the display; and determining whether to connect the call based on the input.

17. The electronic device of claim 16, wherein the PS service network is also capable of CS service and comprises a Long Term Evolution (LTE) network.

18. The electronic device of claim 16, wherein the CS service network comprises at least one of a 2nd Generation (2G) network and a 3rd Generation (3G) network,
the 2G network comprises at least one of a Global System for Mobile communication (GSM) network and a Code Division Multiple Access (CDMA) network, and
the 3G network comprises at least one of a Wideband-CDMA (WCDMA) network, a Time Division-Synchronous CDMA (TD-SCDMA) network, and an Evolution-Data Optimized (EV-DO) network.

19. The electronic device of claim 16, wherein the processor is further configured to receive the incoming call information of the CS service network, included in a CS service notification message or a paging request message transmitted over the PS service network using the communication interface, and maintain the connection over the PS service network without transmitting an extended service request message for the incoming call.

20. The electronic device of claim 16, wherein the processor is further configured to, being connected to the PS service network using the communication interface, switch a radio resource to the CS service network, and receive the incoming call information of the CS service network over the CS service network.

21. The electronic device of claim 16, wherein the processor is further configured to compare the caller identification information with a reception control list and determine whether to connect the call based on the comparison of the caller identification information and the reception control list.

22. The electronic device of claim 16, wherein the processor is further configured to, if determining to reject the call, control to maintain the PS service network connection.

23. The electronic device of claim 16, wherein the processor is further configured to, if determining to accept the call, control to hand over to the CS service network and to connect the call over the CS service network.

24. The electronic device of claim 16, wherein the processor is further configured to transmit an extended service request message including an incoming call rejection information if determining to reject the incoming call.

25. An electronic device comprising: a communication interface configured to transmit and receive signals over a plurality of networks; and a processor configured to: connect to a packet switched (PS) service network through the communication interface, receive information of an incoming call on a circuit switching (CS) service network, while connected to the PS service network, obtain caller identification information of the incoming call by connecting to the CS service network based on the information of the incoming call, and determine whether to connect the incoming call based on the caller identification information while connected to the PS network, wherein determining whether to connect the call comprises: displaying the caller identification information on a display; detecting input on the caller identification information displayed on the display; and determining whether to connect the call based on the input.

26. The electronic device of claim 25, wherein the PS service network is capable of CS service and comprises a Long Term Evolution (LTE) network.

27. The electronic device of claim 25, wherein the CS service network comprises at least one of a 2nd Generation (2G) network and a 3rd Generation (3G) network,
the 2G network comprises at least one of a Global System for Mobile communication (GSM) network and a Code Division Multiple Access (CDMA) network, and
the 3G network comprises at least one of a Wideband-CDMA (WCDMA) network, a Time Division-Synchronous CDMA (TD-SCDMA) network, and an Evolution-Data Optimized (EV-DO) network.

28. The electronic device of claim 25, wherein the processor is further configured to compare the caller identification information with a reception control list, and determine whether to connect the call based on the comparison of the caller identification information and the reception control list.

29. The electronic device of claim 25, wherein the processor is further configured to, if determining to reject the call, control to resume the PS service network connection.

30. The electronic device of claim 25, wherein the processor is further configured to, if determining to accept the call, control to connect the call over the CS service network.

* * * * *